United States Patent
Matsushita et al.

(10) Patent No.: US 12,531,491 B2
(45) Date of Patent: Jan. 20, 2026

(54) ELECTRIC POWER CONVERTER

(71) Applicant: DENSO CORPORATION, Kariya (JP)

(72) Inventors: Junya Matsushita, Kariya (JP); Yohei Imai, Kariya (JP); Yoshihide Fukuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 244 days.

(21) Appl. No.: 18/517,795

(22) Filed: Nov. 22, 2023

(65) Prior Publication Data

US 2024/0088797 A1 Mar. 14, 2024

Related U.S. Application Data

(63) Continuation of application No. PCT/JP2022/018841, filed on Apr. 26, 2022.

(30) Foreign Application Priority Data

May 27, 2021 (JP) ................. 2021-089552

(51) Int. Cl.
*H02M 7/00* (2006.01)
*H01F 27/28* (2006.01)
*H02M 1/00* (2006.01)
*H02M 7/537* (2006.01)

(52) U.S. Cl.
CPC ............ *H02M 7/003* (2013.01); *H01F 27/28* (2013.01); *H02M 1/0009* (2021.05); *H02M 7/537* (2013.01)

(58) Field of Classification Search
CPC .... H02M 7/003; H02M 1/0009; H02M 7/537; H01F 27/28

USPC ........................................................ 363/131
See application file for complete search history.

(56) References Cited

U.S. PATENT DOCUMENTS

| | | | |
|---|---|---|---|
| 10,804,814 B2* | 10/2020 | Sugawara | H02M 7/523 |
| 2009/0319212 A1* | 12/2009 | Cech | B60R 21/0136 702/65 |
| 2021/0249175 A1* | 8/2021 | Ge | H01F 27/38 |

FOREIGN PATENT DOCUMENTS

| | | |
|---|---|---|
| JP | 2002-243766 A | 8/2002 |
| JP | 2020-136321 A | 8/2020 |

\* cited by examiner

*Primary Examiner* — Yemane Mehari
(74) *Attorney, Agent, or Firm* — Oliff PLC

(57) ABSTRACT

An electric power converter converts electric power supplied from a power supply to an electrical load. The electric power converter includes a coil, an electrically conductive portion and a current sensor. The coil extends in an axial direction of the coil. The coil allows a current to flow through the coil. The electrically conductive portion is located at a position apart from the coil. The electrically conductive portion allows the current to flow through the electrically conductive portion. The current sensor detects the current flowing through the electrically conductive portion. The current sensor includes a first sensor element and a second sensor element, each of which detects a magnetic flux being a detected magnetic flux generated by the current flowing through the electrically conductive portion. The first sensor element and the second sensor element are disposed in a radial direction of the coil.

10 Claims, 16 Drawing Sheets

ELECTRIC POWER CONVERTER

CROSS REFERENCE TO RELATED APPLICATIONS

The present application is a continuation application of International Patent Application No. PCT/JP2022/018841 filed on Apr. 26, 2022, which designated the U.S. and claims the benefit of priority from Japanese Patent Application No. 2021-089552 filed on May 27, 2021. The entire disclosures of all of the above applications are incorporated herein by reference.

TECHNICAL FIELD

The present disclosure relates to an electric power converter.

BACKGROUND

A current sensor may detect an electric current. The current sensor may include two magnetic sensors that detect magnetic flux generated by an electric current, and may detect an electric current by detecting a difference between respective outputs of the two magnetic sensors.

DETAILED DESCRIPTION

Figure 1:
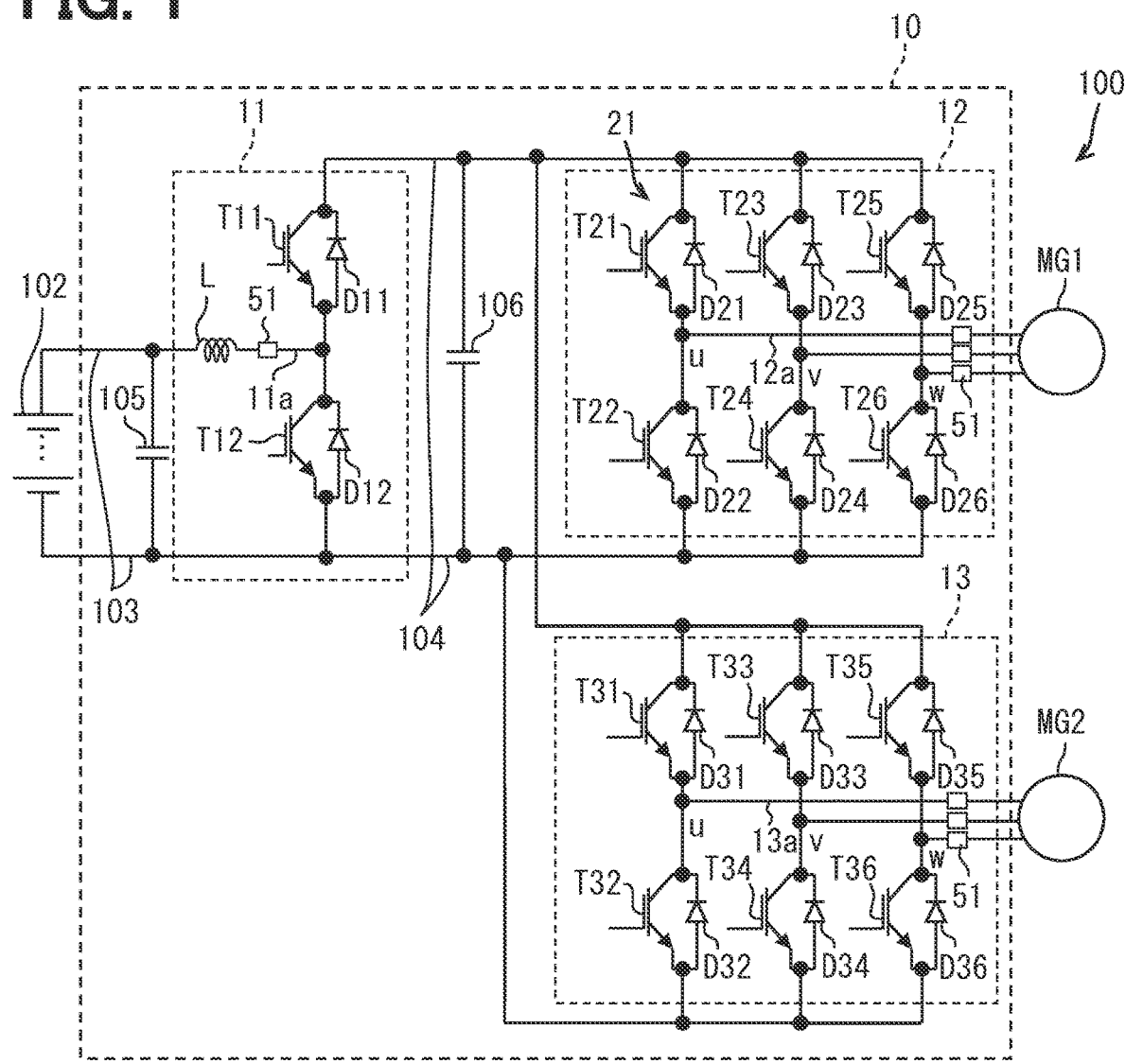
FIG. 1 is a view illustrating a configuration of a drive system according to a first embodiment.

In a current sensor having two magnetic sensors, it may be assumed that an adjacent wiring extends in a direction parallel to a wiring through which a current as a detection target of the magnetic sensor flows. Even when an external magnetic flux is generated by an electric current flowing through the adjacent wiring, the difference between the two magnetic sensors is not affected by the external magnetic flux because the current sensor is arranged such that the two magnetic sensors are disposed in a direction intersecting the external magnetic flux. Since one adjacent wiring extends linearly, the external magnetic flux generated by this adjacent wiring tends to be circular. However, in a configuration in which the magnetic flux generated by the current flowing through the coil becomes external magnetic flux, this external magnetic flux tends to have a shape that extends longer along the center line of the coil. For this reason, it is considered to be difficult to arrange the current sensor so that the two magnetic sensors are disposed in a direction intersecting the external magnetic flux in accordance with the shape of the external magnetic flux. For example, if the position of the current sensor relative to the external magnetic flux shifts and two magnetic sensors are disposed along the external magnetic flux, the directions in which the two magnetic sensors detect the external magnetic flux tend to be opposite to each other. In this case, there may be a difference in the respective results of the two magnetic sensors detecting the external magnetic flux, and this difference may be included as noise in the detection results of the current sensor. There is a concern that current detection accuracy may decrease in the manner described above.

According to an aspect of the present disclosure to achieve the above object, an electric power converter converts electric power supplied from a power supply to an electrical load. The electric power converter includes a coil, an electrically conductive portion and a current sensor. The coil extends in an axial direction and allows a current to flow through the coil. The electrically conductive portion is located at a position being apart from the coil and allows the current to flow through the electrically conductive portion. The current sensor detects the current flowing through the electrically conductive portion. The current sensor has a first sensor element and a second sensor element, each of which detects a magnetic flux being a detected magnetic flux generated by the current flowing through the electrically conductive portion. The first sensor element and the second sensor element are disposed in a radial direction of the coil.

In the above aspect, when the magnetic flux generated by the current flowing through the coil is referred to as external magnetic flux, this external magnetic flux tends to have a flattened shape extending in the axial direction. In this external magnetic flux, a gently curved portion extends in the axial direction, and a sharply curved portion extends in the radial direction. In addition, the gently curved portion tends to exist at a position spaced apart from the coil in the radial direction. The sharply curved portion tends to exist at a position spaced apart from the coil in the axial direction, and is shorter than the gently curved portion.

Therefore, according to the above aspect, the first sensor element and the second sensor element are disposed in the radial direction of the coil. For example, in a current sensor placed apart from the coil in the radial direction, the first sensor element and the second sensor element tend to straddle a portion in the radial direction where the external magnetic flux is gently curved. In other words, the first sensor element and the second sensor element are unlikely to be disposed along a portion where the external magnetic flux is gently curved.

In addition, in a current sensor placed at a position spaced apart from the coil in the axial direction, since the sharp curve of the magnetic flux is relatively shorter, the sharply curved portion is easily located at a portion apart from the first sensor element and the second sensor element in the radial direction. In other words, the first sensor element and the second sensor element are unlikely to be disposed along a portion where the external magnetic flux has a sharp curve.

As described above, even if the current sensor is placed at a position apart from the coil in either the radial direction or the axial direction, a situation in which the first sensor element and the second sensor element are disposed along the external magnetic flux unlikely occurs. Therefore, it is possible to inhibit a situation in which the direction of the external magnetic flux detected by the first sensor element and the direction of the external magnetic flux detected by the second sensor element are opposite to each other. Therefore, the detection accuracy of the electric current by the current sensor can be enhanced.

Hereinafter, embodiments for implementing the present disclosure will be described referring to drawings. In each embodiment, parts corresponding to the matters described in its preceding embodiment(s) will be denoted by the same reference signs as in the preceding embodiment(s), and duplication of description will be omitted as appropriate. In each embodiment, in a case where only a part of the configuration is described, the other parts of the configuration can be implemented by application of the other embodiments described ahead thereof. It may be possible not only to combine parts the combination of which is explicitly described in an embodiment, but also to combine parts of respective embodiments the combination of which is not explicitly described if any obstacle does not especially occur in combining the parts of the respective embodiments.

First Embodiment

A drive system 100 illustrated in FIG. 1 is mounted on a vehicle for example a hybrid vehicle. The drive system 100 includes a battery 102, motors MG1, MG2 and an electric power converter 10. The drive system 100 drives the motors MG1, MG2 to drive the drive wheels of the vehicle.

The battery 102 corresponds to a DC voltage supply including a rechargeable secondary battery, and corresponds to a power supply for supplying electric power to the motors MG1, MG2 through the electric power converter 10. The secondary battery is, for example, a lithium ion battery or a nickel hydrogen battery.

The electric power converter 10 converts DC power of the battery 102 into AC power suitable for driving the motors MG1, MG2. The electric power converter 10 converts AC power generated by the motors MG1, MG2 into DC power with which the battery 102 can be charged. The battery 102 and the motors MG1, MG2 are external devices when viewed from the electric power converter 10.

A motor MG1 functions as a drive source of the vehicle together with an engine (not shown). The motor MG1 mainly functions as an electric motor. The motor MG1 functions as a generator during deceleration or braking, for example. A motor MG2 mainly functions as a generator. The motor MG2 functions as an electric motor by being supplied with AC power when the engine is started, for example. In this manner, the electric power converter 10 is capable of performing a bidirectional power conversion. The motors MG1, MG2 correspond to electrical loads.

The electric power converter 10 includes a boost converter 11 and inverters 12, 13. An input terminal of the boost converter 11 is connected to a low voltage system power line 103 on the battery 102, and an output terminal of the boost converter 11 is connected to a high voltage system power line 104 on the inverters 12, 13 side. The low voltage system power line 103 is a power line that electrically connects the battery 102 with the boost converter 11, and the high voltage system power line 104 is a power line that electrically connects the boost converter 11 with each of the inverters 12, 13.

A smoothing capacitor 105 is connected between a high potential and a low potential of the low voltage system power line 103. A smoothing capacitor 106 is connected between a high potential and a low potential of the high voltage system power line 104. A system main relay (not shown) is provided between a connection point of the low voltage system power line 103 with the capacitor 105 and the battery 102.

The boost converter 11 boosts an output voltage of the battery 102 to a voltage suitable for driving the motors. That is, the boost converter 11 boosts a power of the low voltage system power line 103 and supplies the boosted power to the high voltage system power line 104. In addition, the boost converter 11 steps down the DC power converted by the inverters 12, 13 to power that can be charged in the battery 102. That is, the boost converter 11 steps down the power of the high voltage system power line 104 and supplies the power to the low voltage system power line 103. The output voltage of the battery 102 is, for example, about 300 volts, and an output of the boost converter 11 is, for example, about 600 volts.

The boost converter 11 includes a reactor L, two switching elements T11, T12, and two diodes D11, D12. The switching elements T11, T12 are connected in series between the high potential and the low potential of the high voltage system power line 104 with a switching element T11 on the high potential. The switching elements T11, T12 are semiconductor elements such as IGBTs, and power MOSFETs. In the present embodiment, as the switching elements T11, T12, n-channel type IGBTs are employed. The switching elements T11, T12 correspond to power elements.

The diodes D11, D12 are connected in antiparallel to the corresponding switching elements T11, T12. Anodes of the diodes D11, D12 are connected to the emitter electrodes of the corresponding switching elements T11, T12.

One end of the reactor L is connected to the high potential of the low voltage system power line 103, that is, a positive electrode terminal of the capacitor 105. The other end of the reactor L is connected to a connection point between the switching elements T11, T12.

The inverters 12, 13 convert the input DC power into three-phase AC power having a predetermined frequency, and output the three-phase AC power to the corresponding motors MG1, MG2. The inverters 12, 13 convert electric power generated by the corresponding motors MG1, MG2 from AC electric power to DC electric power. The electric power generated by the motor MG2 is selectively used according to a traveling state of the hybrid vehicle and a state of charge (SOC) of the battery 102. SOC is an abbreviation for State of Charge.

For example, during normal traveling, the electric power generated by the motor MG2 is directly used as electric power for driving the motor MG1. On the other hand, when the SOC of the battery 102 is lower than a predetermined value, the electric power generated by the motor MG2 is converted from AC to DC by the inverter 13, and then the voltage is adjusted by the boost converter 11 and charged in the battery 102. The electric power generated by the motor MG1 is converted from AC to DC by the inverter 12, and then the voltage is adjusted by the boost converter 11 and charged in the battery 102.

The inverter 12 is connected to the high voltage system power line 104. The inverter 12 includes six switching elements T21 to T26 and six diodes D21 to D26. The switching elements T21, T22 are connected in series between the high potential and the low potential of the high voltage system power line 104 with the switching element T21 on the high potential, and constitute a U-phase upper and lower arm. A connection point of the switching elements T21, T22 is electrically connected to a U-phase coil (not shown) of the motor MG1. The switching elements T23, T24 are connected in series between the high potential and the low potential of the high voltage system power line 104 with the switching element T23 on the high potential, and constitute a V-phase upper and lower arm. A connection point of the switching elements T23, T24 is electrically connected to a V-phase coil (not shown) of the motor MG1. The switching elements T25, T26 are connected in series between the high potential and the low potential of the high voltage system power line 104 with the switching element T25 on the high potential, and constitute a W-phase upper and lower arm. A connection point of the switching elements T25, T26 is electrically connected to a W-phase coil (not shown) of the motor MG1.

The switching elements T21 to T26 are semiconductor elements such as IGBTs, and power MOSFETs. In the present embodiment, as the switching elements T21 to T26, n-channel type IGBTs are employed. The diodes D21 to D26 are connected in antiparallel to the corresponding switching elements T21 to T26. Anodes of the diodes D21 to D26 are connected to the emitter electrodes of the corresponding switching elements T21 to T26. The switching elements T21 to T26 correspond to power elements.

The inverter 13 has the same configuration as the inverter 12. The inverter 13 includes six switching elements T31 to T36 and six diodes D31 to D36 connected in antiparallel to the corresponding switching elements T31 to T36. The switching elements T31, T32 are connected in series between the high potential and the low potential of the high voltage system power line 104 with the switching element T31 on the high potential, and a connection point is electrically connected to a U-phase coil (not shown) of the motor MG2. The switching elements T33, T34 are connected in series between the high potential and the low potential of the high voltage system power line 104 with the switching element T33 on the high potential, and a connection point is electrically connected to a V-phase coil (not shown) of the motor MG2. The switching elements T35, T36 are connected in series between the high potential and the low potential of the high voltage system power line 104 with the switching element T35 on the high potential, and a connection point are electrically connected to a W-phase coil (not shown) of the motor MG2.

The switching elements T31 to T36 are semiconductor elements such as IGBTs, and power MOSFETs. In the present embodiment, as the switching elements T31 to T36, n-channel type IGBTs are employed. The diodes D31 to D36 are connected in antiparallel to the corresponding switching elements T31 to T36. Anodes of the diodes D31 to D36 are connected to the emitter electrodes of the corresponding switching elements T31 to T36. The switching elements T31 to T36 correspond to power elements.

The electric power converter 10 includes current sensors 51. The current sensors 51 are provided in each of the boost converter 11 and the inverters 12, 13. The current sensors 51 detect an electric current flowing through each of the connection lines 11a, 12a, 13a. A connection line 11a electrically connects a connection point between the reactor L and the switching elements T11, T12. A connection line 12a is a connection line for connecting a connection point of the upper and lower arms of each phase of the inverter 12 to the coil of the corresponding phase of the motor MG1. The connection line 13a is a connection line for connecting a connection point of the upper and lower arms of each phase of the inverter 13 to the coil of the corresponding phase of the motor MG2.

Figure 2:
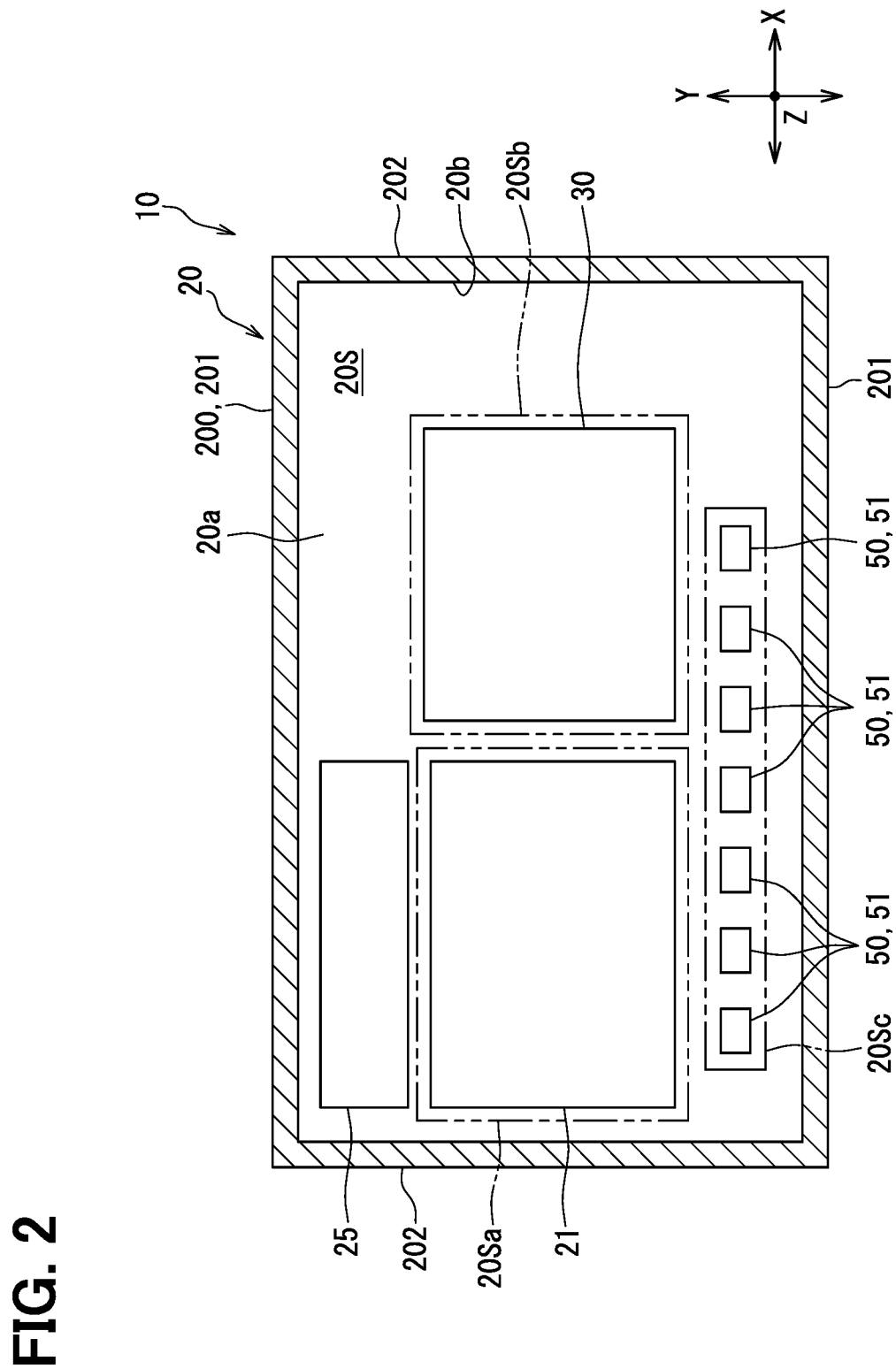
FIG. 2 is a plan view illustrating a schematic configuration of an electric power converter.

Next, a structure of the electric power converter 10 will be described. As shown in FIG. 2, the electric power converter 10 includes a device case 20, a power unit 21, a capacitor unit 25, a reactor unit 30, and a sensor unit 50.

The power unit 21, the capacitor unit 25, the reactor unit 30, and the sensor unit 50 are stored in the device case 20 and may be referred to as internal devices. The inner surface of the device case 20 includes a case floor surface 20a and a case inner wall surface 20b. The units 21, 25, 30, 50 are arranged on the case floor surface 20a. In the electric power converter 10, directions orthogonal to each other are referred to as an X-direction, a Y-direction, and a Z-direction, and a direction orthogonal to the case floor surface 20a is referred to as the Z-direction. In the device case 20, for example, the power unit 21 and the reactor unit 30 are disposed in the X-direction.

The device case 20 has an internal space 20S. The internal space 20S stores the units 21, 25, 30, and 50, and is sometimes referred to as an storage space. The internal space 20S is formed by a case floor surface 20a and a case inner wall surface 20b. The device case 20 has a rectangular shape in plan view. The device case 20 extends so that the X-direction is the lengthwise direction. With regard to the device case 20, the Y-direction is the widthwise direction. The case floor surface 20a has a pair of long sides and a pair of short sides, and is formed in a rectangular shape. In the case floor surface 20a, the long side extends in the X-direction, and the short side extends in the Y-direction.

The device case 20 has a case wall portion 200. The case wall portion 200 forms a case inner wall surface 20b. The case wall portion 200 includes a first wall portion 201 and a second wall portion 202. The first wall portions 201 extend in the X-direction, and are provided as a pair with the case floor surface 20a interposed therebetween. The second wall portions 202 extend in the Y-direction, and are provided as a pair with the case floor surface 20a interposed therebetween.

The power unit 21 constitutes the boost converter 11 and the inverters 12, 13 described above. The power unit 21 includes power cards 22 (see FIG. 3). Upper and lower arms are respectively formed on the power cards 22. Each of the power cards 22 includes a power element such as a switching element T11 for converting electric power, and corresponds to a power module. The power cards 22 are arranged at a predetermined pitch in the X-direction. The power unit 21 includes, for example, seven power cards 22. The boost converter 11 includes one power card 22. Each of the inverters 12, 13 includes three power cards 22. The power unit 21 may be referred to as a semiconductor module, and the power card 22 may be referred to as a semiconductor device.

The power unit 21 includes coolers (not shown) in addition to the power cards 22 described above. The coolers and the power cards 22 are alternately stacked in the X-direction to configure the power unit 21.

The power card 22 constituting the boost converter 11 includes the switching elements T11, T12 and the diodes D11, D12. The power card 22 of a U-phase constituting the inverter 12 includes the switching elements T21, T22 and the diodes D21 and D22, and the power card 22 of V-phase includes the switching elements T23, T24 and the diodes D23, D24. The power card 22 of a W-phase constituting the inverter 12 includes the switching elements T25, T26 and the diodes D25, D26.

The power card 22 of a U-phase constituting the inverter 13 includes switching elements T31 and T32 and diodes D31 and D32, and the V-phase power card 22 includes switching elements T33 and T34 and diodes D33 and D34. The power card 22 of a W-phase constituting the inverter 12 includes the switching elements T35, T36 and the diodes D35, D36.

The capacitor unit 25 includes a capacitor element constituting the capacitor 105,106 and a unit main body protecting the capacitor element. The unit main body includes a capacitor case that houses the capacitor element.

The reactor unit 30 is a reactor device that constitutes a reactor L. The reactor unit 30 has a coil 31 and a core 40. The coil 31 is a reactor element that constitutes the reactor L, and is a passive element. The coil 31 is formed of a winding such as an insulated wire. The winding wire forms a coil 31 in a wound state. The core 40 is made of a magnetic material, and together with the coil 31 constitutes a magnetic circuit. The coil 31 is wound around a part of the core 40. The magnetic flux generated by the current flowing through the coil 31 passes through the core 40. The reactor unit 30 is sometimes referred to as a coil unit or a coil device.

Figure 3:
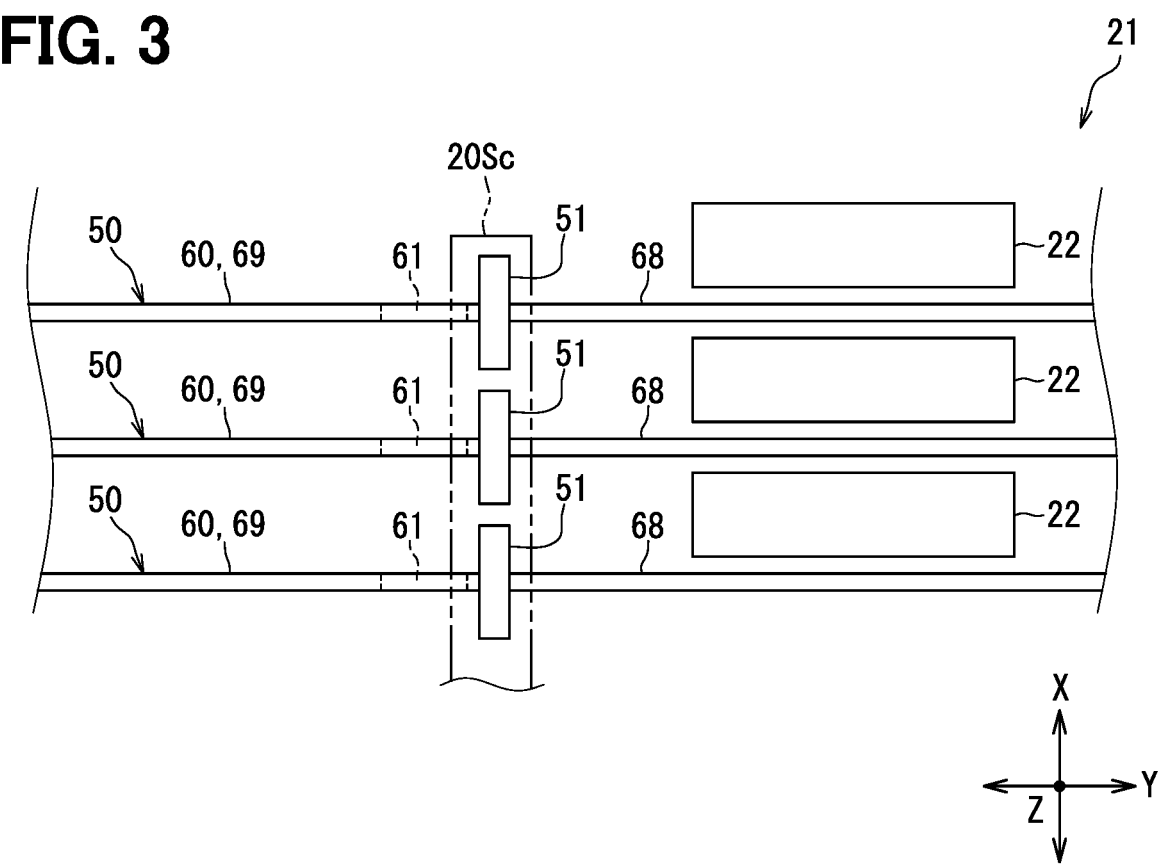
FIG. 3 illustrates a configuration of a power unit and a sensor unit.

As shown in FIGS. 2, 3, multiple sensor units 50 are provided in the device case 20. The sensor units 50 are disposed in the X-direction, for example. The sensor unit 50 includes the current sensor 51 and a busbar 60. One sensor unit 50 includes one current sensor 51 and one busbar 60. Multiple current sensors 51 are provided in the device case 20. The sensor unit 50 corresponds to a current detection device and may be referred to as a current sensor device. The sensor unit 50 is the current sensor 51 with the busbar 60, and is also the busbar 60 with the current sensor 51. In FIG. 2, the busbar 60 is not shown.

The busbar 60 is a conductive member having electrically conductive and made of a metal material or the like. The busbar 60 forms an electrical conductive path through which an electric current flows, and corresponds to an electrical conductive member. The busbar 60 has a plate shape as a whole and extends in a direction orthogonal to the Z-direction as a whole. The busbar 60 has a plate-like elongated member. The busbar 60 is formed by punching or bending a metal plate made of copper or the like.

The busbar 60 is electrically connected to the power card 22. An electric current flows through the busbar 60 when the power card 22 is energized. The busbar 60 is provided individually for each of the power cards 22. Each of busbars 60 includes a busbar 60 that forms each of the connection lines 11a, 12a, 13a. For example, seven busbars 60 are provided in the device case 20. The busbars 60 forming the connection lines 11a, 12a, and 13a are one, three, and three in this order. The seven busbars 60 are disposed in the order corresponding to the U-phase, the V-phase, and the-W phase of the inverter 12, the U-phase, the V-phase, and the W-phase of the inverter 13, and the boost converter 11 from the power unit 21 toward the reactor unit 30 in the X-direction, for example.

In the boost converter 11, the busbar 60 electrically relays the reactor L and the connection point between the switching elements T11, T12. That is, the busbar 60 constitutes a part of the connection line 11a. In the inverter 12, for example, the U-phase busbar 60 electrically relays the U-phase coil of the motor MG1 and the connection point between the switching elements T21, T22. That is, the U-phase busbar 60 constitutes a part of the connection line 12a. In the inverter 13, for example, the U-phase busbar 60 electrically relays the U-phase coil of the motor MG2 and the connection point between the switching elements T31, T32. That is, the U-phase busbar 60 constitutes a part of the connection line 13a.

Figure 4:
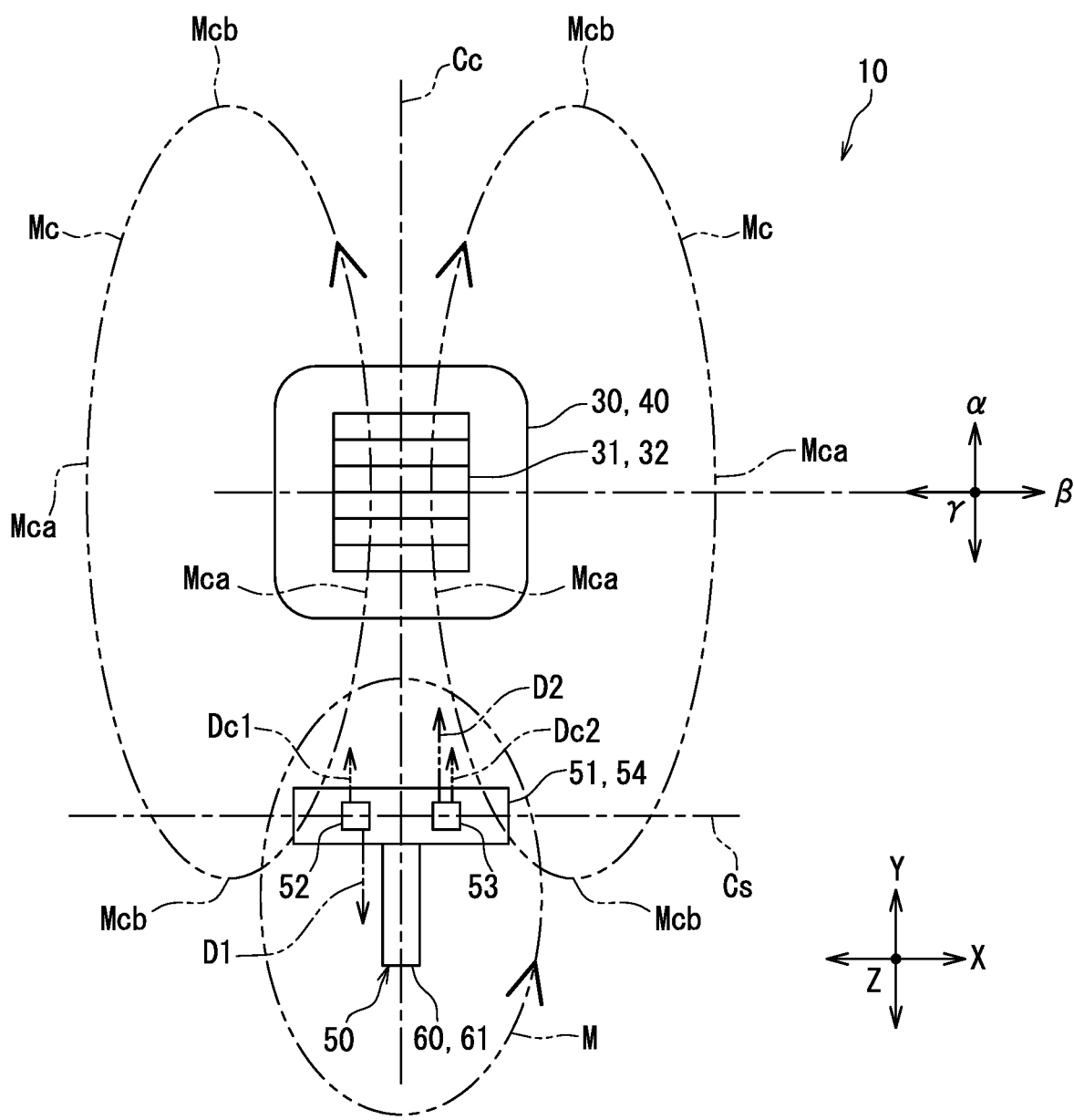
FIG. 4 explains each detection value of a first sensor element and a second sensor element.

As shown in FIGS. 3, 4, the busbar 60 includes a connecting portion 61, a card-side base portion 68, and an opposite-side base portion 69. The connecting portion 61 is provided between the card-side base portion 68 and the opposite-side base portion 69 in the electrical conductive path. The connecting portion 61 extends over the card-side base portion 68 and the opposite-side base portion 69, and connects the card-side base portion 68 and the opposite-side base portion 69. The connecting portion 61, the card-side base portion 68, and the opposite-side base portion 69 are covered with a covering portion made of a resin material or the like. The covering portion has an insulating property and protects the connecting portion 61, the card-side base portion 68, and the opposite-side base portion 69.

The card-side base portion 68 extends from the connecting portion 61 toward the power card 22 and is electrically connected to the power card 22. The opposite-side base portion 69 extends from the connecting portion 61 in a direction away from the power card 22, and is electrically connected to an internal device or an external device. For example, in the busbar 60 included in the boost converter 11, the opposite-side base portion 69 is electrically connected to the reactor L. In the busbar 60 included in the inverter 12, the opposite-side base portion 69 is electrically connected to the motor MG1 via a terminal portion. In the busbar 60 included in the inverter 13, the opposite-side base portion 69 is electrically connected to the motor MG2 via a terminal portion. The terminal portion is included in a terminal block installed in the device case 20, and is connected to an electrical conductive member such as the busbar 60.

The busbar 60 extends between the power unit 21 and the sensor unit 50. The busbar 60 is included in both the power unit 21 and the sensor unit 50. In the busbar 60, at least the card-side base portion 68 is included in the power unit 21, and at least the connecting portion 61 is included in the sensor unit 50. In the present embodiment, all of the connecting portion 61, the card-side base portion 68, and the opposite-side base portion 69 are included in the sensor unit 50.

Each of the card-side base portion 68 and the opposite-side base portion 69 has a plate shape. The card-side base portion 68 and the opposite-side base portion 69 extend in the Y-direction with their plate surfaces extending in a direction orthogonal to the X-direction. In the card-side base portion 68 and the opposite-side base portion 69, the Y-direction is a lengthwise direction, the Z-direction is a widthwise direction, and the X-direction is a thickness direction. The card-side base portion 68 and the opposite-side base portion 69 are provided at positions separated from each other in the X-direction. Portions of the card-side base portion 68 and the opposite-side base portion 69 overlap each other in the X-direction. The card-side base portion 68 and the opposite-side base portion 69 are connected to each other by a connecting portion 61 at their overlapping portions.

The connecting portion 61 is formed into a plate shape as a whole, and extends in the Z-direction as a whole. The connecting portion 61 has a pair of plate surfaces, and these plate surfaces are oriented orthogonal to the X-direction. The connecting portion 61 connects the card-side base portion 68 and the opposite-side base portion 69 so as to conduct electricity, and corresponds to an electric conductive portion.

The current sensor 51 is a current detection unit that detects an electric current flowing through the busbar 60. In the present embodiment, the current sensor 51 detects a magnetic flux generated by the electric current flowing through the connecting portion 61 with the electric current flowing through the connecting portion 61 as a detection target, and detects the electric current based on the magnetic flux. The current sensor 51 is a coreless type current sensor that does not have a magnetism collecting core for converging magnetic flux.

As shown in FIG. 4, the current sensor 51 includes a first sensor element 52, a second sensor element 53, and a sensor main body 54. Each of the sensor elements 52, 53 is a magnetic sensor that detects a magnetic field. Each of the sensor elements 52, 53 detects the magnetic flux of the magnetic field and outputs a detection signal corresponding to magnetic flux density. Each of the sensor elements 52, 53 is an element that converts a magnetic signal into an electric signal, and may be referred to as a magnetoelectric conversion element. Each of the sensor elements 52, 53 is, for example, a Hall element. Each of the sensor elements 52, 53 has a predetermined detection direction and detects a magnetic flux passing through the sensor element 52 in the detection direction. For example, the detection signal of each of the sensor elements 52, 53 includes information on a component extending in the detection direction of the magnetic flux passing through each of the sensor elements 52, 53, but does not include information on a component orthogonal to the detection direction. That is, each of the sensor elements 52, 53 detects a component extending in the detection direction of the magnetic flux passed through each of the sensor elements 52, 53, but does not detect a component orthogonal to the detection direction.

The sensor main body 54 has a plate shape as a whole made of a resin material or the like, and stores each of the sensor elements 52, 53 in a state of being covered. The sensor main body 54 protects each of the sensor elements 52, 53 in a state in which each of the sensor elements 52, 53 is capable of detecting the magnetic flux, and corresponds to an element protector. The sensor main body 54 is fixed to the busbar 60 by being joined to the covering portion with an adhesive or the like. The current sensor 51 includes a sensor terminal and a sensor substrate (not shown). The sensor terminal has an elongated shape made of a metal material or the like, and is electrically connected to each of the sensor elements 52, 53. One end of the sensor terminal is embedded in the sensor main body 54, and the other end of the sensor terminal protrudes from the sensor main body 54.

The sensor substrate is provided on a detection circuit that detects an electric current flowing through the busbar 60. The detection circuit is electrically connected to each of the sensor elements 52, 53 and the sensor terminal. The detection circuit calculates the electric current using the detection signal received from each of the sensor elements 52, 53, and outputs the calculation result from the sensor terminal as the detection signal of the current sensor 51. The current sensor 51 outputs the detection signal to the controller. The controller is included in the electric power converter 10 and controls the boost converter 11 and the inverters 12, 13. For example, the controller controls driving of the switching elements T11, T12, T21 to T26, T31 to T36.

The current sensor 51 is a differential current detection unit. The current sensor 51 calculates the difference between the detection value detected by the first sensor element 52 and the detection value detected by the second sensor element 53, and calculates the current using this difference. The detection circuit calculates a magnetic flux density for each of the detection values of the first sensor element 52 and the second sensor element 53, and calculates a difference between the magnetic flux densities. The detection circuit calculates the electric current using the difference between the magnetic flux densities.

As shown in FIG. 2, the internal space 20S of the device case 20 includes a power region 20Sa, a reactor region 20Sb, and a sensor region 20Sc. The power region 20Sa is a region of the internal space 20S that stores the power unit 21. The outer peripheral edge of the power region 20Sa extends along the outer peripheral edge of the power unit 21. The power region 20Sa is a single space portion, and extends over the multiple power cards 22 and the multiple busbars 60. The outer peripheral edge of the power area 20Sa partially includes the outer surface of at least one power card 22.

The reactor region 20Sb is a region of the internal space 20S that stores the reactor unit 30, and is a single space portion. The outer peripheral edge of the reactor region 20Sb extends along the outer peripheral edge of the reactor unit 30. For example, in a plan view, the outer peripheral edge of the reactor region 20Sb matches the outer peripheral edge of the reactor unit 30. The reactor region 20Sb corresponds to a coil region.

The sensor region 20Sc is a region in the internal space 20S that stores the multiple current sensors 51. The sensor region 20Sc is a single space portion and extends over the multiple current sensors 51. The outer surface of at least one current sensor 51 is partially included in the outer peripheral edge of the sensor region 20Sc.

The current sensors 51 are arranged along the case inner wall surface 20b. For example, the current sensors 51 are disposed in a single line along the first wall portion 201 in the X-direction. The sensor region 20Sc has a size and shape that match the arrangement of the multiple current sensors 51. For example, the sensor region 20Sc extends along the case inner wall surface 20b and has an elongated shape. The sensor region 20Sc extends in the X-direction along the first wall portion 201.

In the device case 20, the power region 20Sa and the reactor region 20Sb are disposed in the X-direction along the first wall portion 201. The power region 20Sa and the reactor region 20Sb are adjacent to each other in the X-direction and are arranged as closer to each other as possible. The sensor region 20Sc is disposed in the Y-direction along the second wall portion 202 with respect to the power region 20Sa and the reactor region 20Sb. The sensor region 20Sc extends over the power region 20Sa and the reactor region 20Sb in the X-direction. The sensor region 20Sc faces each of the power region 20Sa and the reactor region 20Sb in the Y-direction.

The sensor region 20Sc has a portion that overlaps the power region 20Sa in the Y-direction and a portion that overlaps the reactor region 20Sb in the Y-direction. The sensor region 20Sc does not protrude further to the opposite side of the reactor region 20Sb than the power region 20Sa in the X-direction. The sensor region 20Sc is provided at a position shifted in the X-direction with respect to the power region 20Sa and the reactor region 20Sb. For example, in the X-direction, on the opposite side of the reactor region 20Sb from the power region 20Sa, the reactor region 20Sb protrudes beyond the sensor region 20Sc. Furthermore, the sensor region 20Sc does not protrude further to the opposite side of the power region 20Sa than the reactor region 20Sb in the X-direction. For example, in the X-direction, on the opposite side of the power region 20Sa from the reactor region 20Sb, the power region 20Sa protrudes beyond the sensor region 20Sc.

In the sensor region 20Sc, at least one current sensor 51 is entirely included in a portion that overlaps the power region 20Sa in the Y-direction. The current sensor 51 included in this portion is provided at a position overlapping the power region 20Sa in the Y-direction. For example, four current sensors 51 that detect currents respectively for the U-phase, V-phase, and W-phase of the inverter 12, and the U-phase of the inverter 13 are located at positions overlapping the power region 20Sa in the Y-direction.

In the sensor region 20Sc, at least one current sensor 51 is entirely included in a portion overlapping the reactor region 20Sb in the Y-direction. The current sensor 51 included in this portion is provided at a position overlapping the reactor region 20Sb in the Y-direction. For example, two current sensors 51 that detect currents respectively for the W-phase of inverter 13 and the boost converter 11 are located at positions overlapping the reactor region 20Sb in the Y-direction.

In the present embodiment, the current sensor 51 is located at a position where the entirety of the current sensor 51 overlaps the reactor region 20Sb in the Y-direction. Therefore, with regard to the current sensor 51 located at a portion overlapping the reactor region 20Sb in the Y-direction, only a portion of the current sensor 51 is not located at a position overlapping the reactor region 20Sb in the Y-direction. The same applies to the power region 20Sa.

As shown in FIG. 4, the reactor unit 30 is provided with the coil center line Cc extending in the Y-direction. The coil center line Cc is an imaginary center line extending linearly through the center of the coil 31. With regard to the coil 31, if the direction in which the coil center line Cc extends is referred to as the axial direction α, this axial direction α, the radial direction β of the coil center line Cc, and the circumferential direction γ of the coil center line Cc are orthogonal to each other. In the coil 31, the axial direction α coincides with the Y-direction.

In the coil 31, the winding is wound in the circumferential direction γ, and an annular portion 32 extends in the circumferential direction γ. The circumferential direction γ corresponds to the winding direction of the winding. In the coil 31, the multiple annular portions 32 formed by windings are disposed in the axial direction α. The coil center line Cc passes through the center of each of the multiple annular portions 32. The annular portion 32 goes around the coil center line Cc, and has a rectangular annular shape that is chamfered as a whole. A hollow portion extending in the axial direction α is formed inside the coil 31.

With regard to the reactor unit 30, a coil magnetic flux Mc is generated by the current flowing through the coil 31. The coil magnetic flux Mc includes a magnetic flux, which leaks from the core 40 to the outside, of all the magnetic flux generated by the current flowing through the coil 31. The coil magnetic flux Mc has a flattened shape extending in the lengthwise direction of the coil 31. That is, the coil magnetic flux Mc has a flattened shape extending in the axial direction α along the coil center line Cc. For the coil magnetic flux Mc, the axial direction α is the lengthwise direction, and the radial direction β is the widthwise direction. For example, the coil magnetic flux Mc is oriented to move into the coil 31 away from the current sensor 51.

In each of the multiple sensor units 50, the current sensor 51 is provided to the connecting portion 61 of the busbar 60. The current sensor 51 is provided at a position lined up with the connecting portion 61 in the axial direction α. The current sensor 51 is provided between the reactor unit 30 and the connecting portion 61 in, for example, the axial direction α. In the current sensor 51, for example, the sensor main body 54 is in contact with the covering portion of the connecting portion 61.

With regard to the busbar 60, a connection magnetic flux M is generated by the current flowing through the connecting portion 61. The connection magnetic flux M extends so as to go around the connecting portion 61. The current sensor 51 is provided so that the sensor elements 52 and 53 can detect the connection magnetic flux M. The connection magnetic flux M is a detection target detected by the sensor elements 52 and 53, and corresponds to the detected magnetic flux. The coil magnetic flux Mc is not a detected magnetic flux but corresponds to an external magnetic flux for the sensor elements 52 and 53.

The first sensor element 52 and the second sensor element 53 are lined up at a predetermined interval in the radial direction β. For example, the sensor elements 52 and 53 are disposed in the X-direction. In the X-direction, the center of the connecting portion 61 is located between the first sensor element 52 and the second sensor element 53. The first sensor element 52 is located at a position separated from the connecting portion 61 in the Z-direction. The second sensor element 53 is located at a position on a side opposed from the first sensor element 52 and spaced apart from the connecting portion 61 in the X-direction. The first sensor element 52 and the second sensor element 53 are disposed in a direction orthogonal to the direction of the current flowing through the connecting portion 61.

In the current sensor 51, if a virtual line passing through the center of each of the sensor elements 52 and 53 and extending linearly in the radial direction β is called an element center line Cs, this virtual element center line Cs is orthogonal to the coil center line Cc. The first sensor element 52 and the second sensor element 53 are lined up at a predetermined interval in the element center line Cs.

In the current sensor 51, the detection direction of the first sensor element 52 is the same as the detection direction of the second sensor element 53. Each detection direction of the sensor elements 52 and 53 is the Y-direction. That is, each detection direction of the sensor elements 52 and 53 is in the axial direction α.

In the current sensor 51, the sensor elements 52 and 53 detect the connection magnetic flux M. The detection value of the first sensor element 52 includes a first connection value D1 that is the detection of the connection magnetic flux M. The detection value of the second sensor element 53 includes a second connection value D2 obtained by detecting the connection magnetic flux M. The direction of the connection magnetic flux M detected by the first sensor element 52 and the direction of the connection magnetic flux M detected by the second sensor element 53 are opposite to each other in the axial direction α. Therefore, one of the first connection value D1 and the second connection value D2 becomes a positive value, and the other one of the first connection value D1 and the second connection value D2 becomes a negative value. That is, the first connection value D1 and the second connection value D2 are values indicating that the directions of the connection magnetic flux M are opposite to each other in the detection direction of the sensor elements 52 and 53.

The first sensor element 52 and the second sensor element 53 are disposed along the connection magnetic flux M as a whole. The current sensor 51 is arranged at a position where the connection magnetic flux M is spread across the first sensor element 52 and the second sensor element 53.

When the coil magnetic flux Mc generated by the coil 31 reaches the sensor elements 52, 53, the sensor elements 52, 53 detect the coil magnetic flux Mc in addition to the connection magnetic flux M. In this case, the detection value of the first sensor element 52 includes, in addition to the first connection value D1, the first coil value Dc1 that is the result of detecting the coil magnetic flux Mc. The detection value of the second sensor element 53 includes, in addition to the first connection value D1, a second coil value Dc2 obtained by detecting the coil magnetic flux Mc.

As shown in FIG. 4, when the direction of the coil magnetic flux Mc detected by the first sensor element 52 and the direction of the coil magnetic flux Mc detected by the second sensor element 53 are identical, both of the first coil value Dc1 and the second coil value Dc2 becomes one of the positive value and the negative value. That is, the first coil value Dc1 and the second coil value Dc2 are values indicating that the direction of the coil magnetic flux Mc is the same in the detection direction of the sensor elements 52 and 53. Therefore, while the difference between the detection value of the first sensor element 52 and the detection value of the second sensor element 53 includes the difference between the first connection value D1 and the second connection value D2, the first coil value Dc1 and the second coil value Dc2 cancel each other out. In this way, when the first sensor element 52 and the second sensor element 53 detect the coil magnetic flux Mc in the same direction, the detection accuracy of the current sensor 51 is prevented from decreasing due to the coil values Dc1 and Dc2.

The coil magnetic flux Mc includes a long curved portion Mca and a short curved portion Mcb. In the coil magnetic flux Mc, a portion extending in the axial direction α is a long curved portion Mca, and a portion extending in the radial direction β is a short curved portion Mcb. The long curved portion Mca extends in the axial direction α, and is a portion where the curve is relatively gentle in the coil magnetic flux Mc. The long curved portion Mca is located at a position spaced apart from the coil 31 in the radial direction β. The short curved portion Mcb extends in the radial direction β and is a relatively sharply curved portion in the coil magnetic flux Mc. The short curved portion Mcb is located at a position spaced apart from the coil 31 in the axial direction α. The short curved portion Mcb is curved more tightly and shorter than the long curved portion Mca. For example, the length of the short curved portion Mcb in the radial direction β is smaller than the length of the long curved portion Mca in the axial direction α.

In the present embodiment, the multiple current sensors 51 are disposed in the radial direction β at positions spaced apart from the coil 31 in the axial direction α. In a region spaced apart from the coil 31 in the axial direction α, the first sensor element 52 and the second sensor element 53 may be disposed along the short curved portion Mcb. However, since the short curved portion Mcb is relatively short in the radial direction β, the possibility that the current sensor 51 is located at a position where the short curved portion Mcb passes is relatively low. That is, the possibility that the first sensor element 52 and the second sensor element 53 are arranged along the short curved portion Mcb is relatively low.

For example, the current sensor 51 shown in FIG. 4 is located at a position lined up with the coil 31 in the axial direction α along the coil center line Cc. That is, this current sensor 51 is located at a position spaced apart from the short curved Mcb toward the coil center line Cc in the radial direction β. In this current sensor 51, the first sensor element 52 and the second sensor element 53 are unlikely to be arranged along the short curved portion Mcb. In this current sensor 51, it is unlikely to have a situation in which both the first coil value Dc1 and the second coil value Dc2 become one of a positive value and a negative value and the current detection accuracy decreases due to these coil values Dc1, Dc2. Even one or more of the multiple current sensors 51 is located at a position spaced from the short curved portion Mcb in the radial direction β on the opposite side of the coil center line Cc, it is unlikely to have a situation in which the first sensor element 52 and the second sensor element 53 are disposed along the short curved portion Mcb.

Figure 5:
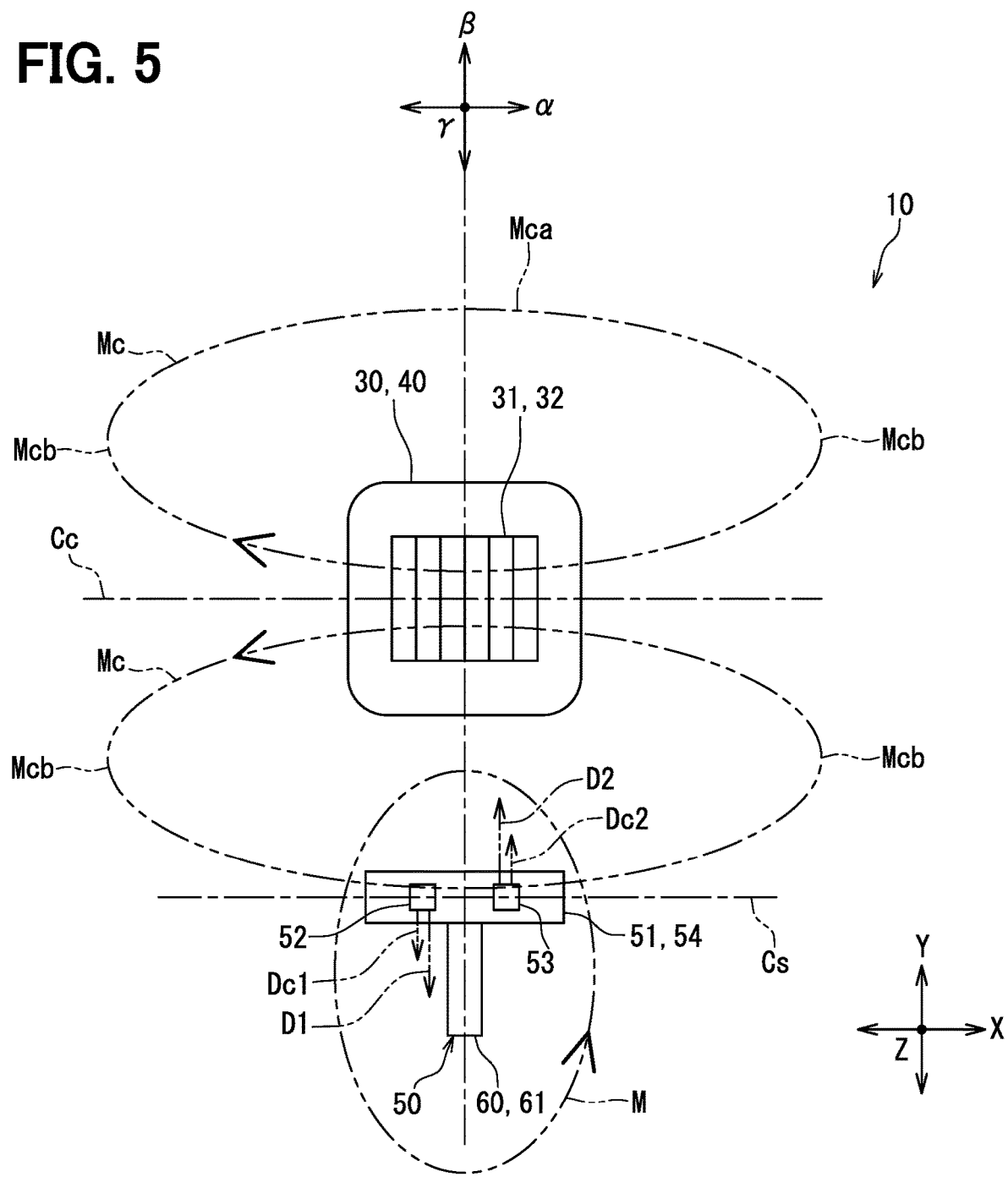
FIG. 5 explains each detection value of a first sensor element and a second sensor element in a comparative example.

For the electric power converter 10, for example, a comparative example 10× different from the present embodiment is assumed. As shown in FIG. 5, the reactor unit 30 of the comparative example 10× is provided with the coil center line Cc extending in the X-direction. In the comparative example 10×, the current sensors 51 are disposed in the axial direction α at positions spaced apart from the coil 31 in the radial direction β. In the comparative example 10×, the axial direction α coincides with the X direction; and the sensor elements 52 and 53 of the current sensor 51 are disposed in the axial direction α along the coil center line Cc. That is, the possibility that the first sensor element 52 and the second sensor element 53 in the comparative example 10× are disposed along the long curved portion Mca is relatively high.

The current sensor 51 shown in FIG. 5 is one or more of the multiple sensors 51 in the comparative example 10× in which the sensor elements 52, 53 are arranged along the long curved portion Mca. In this current sensor 51, the direction of the coil magnetic flux Mc detected by the first sensor element 52 and the direction of the coil magnetic flux Mc detected by the second sensor element 53 are opposite to each other in the Y-direction. Therefore, one of the first coil value Dc1 and the second coil value Dc2 becomes a positive value, and the other becomes a negative value. In this case, in the difference between the detection value of the first sensor element 52 and the detection value of the second sensor element 53, the difference between the first coil value Dc1 and the second coil value Dc2 is included without the cancellation of the first coil value Dc1 and the second coil value Dc2. In this way, when the detection directions of the coil magnetic flux Mc are different between the first sensor element 52 and the second sensor element 53, a situation in which the detection accuracy of the current sensor 51 is decreased by the coil values Dc1 and Dc2 may occur.

Figure 6:
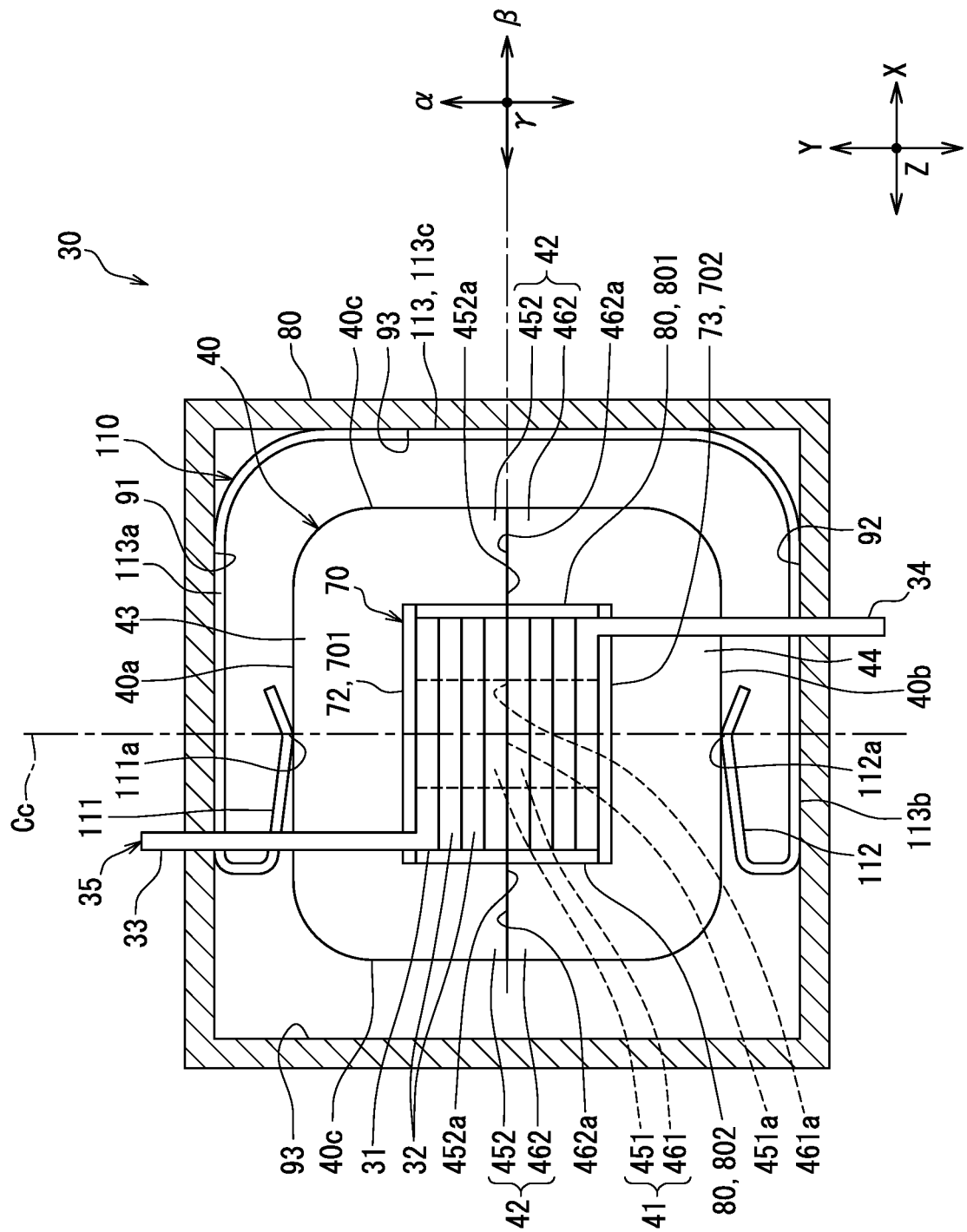
FIG. 6 illustrates a configuration of a reactor unit.

As shown in FIG. 6, the reactor unit 30 has a coil body 35. The coil body 35 includes the coil 31. In addition to the coil 31, the coil body 35 has a first coil terminal 33 and a second coil terminal 34. The first coil terminal 33 has one end of a winding that forms the coil 31, and is a portion of the winding that extends from the coil 31. The second coil terminal 34 has the other end of the winding that forms the coil 31, and is a portion of the winding that extends from the coil 31.

Figure 9:
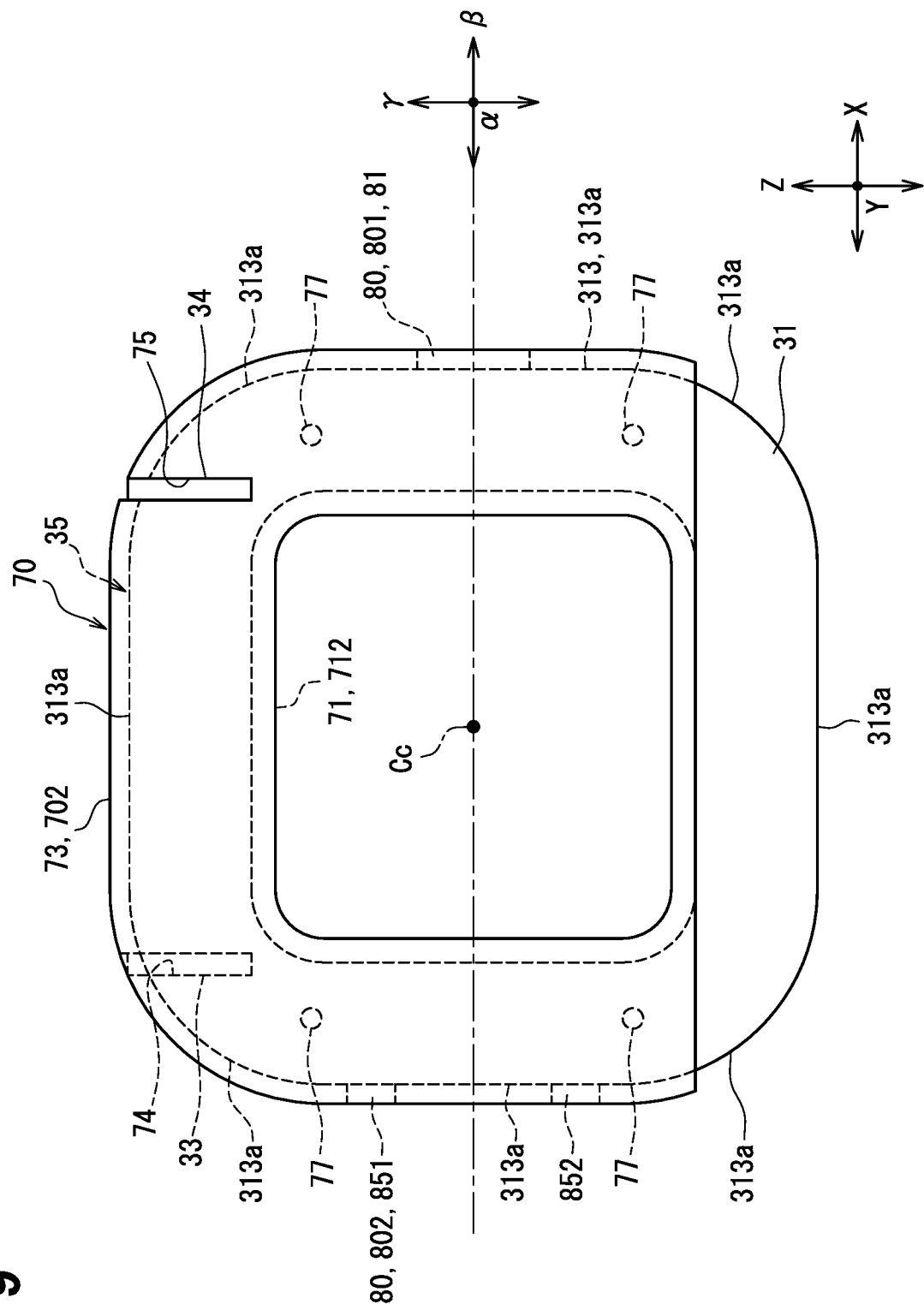
FIG. 9 is a diagram of the bobbin and the coil body viewed from a second flange side.

As shown in FIG. 9, the coil 31 has a first coil end surface 311, a second coil end surface 312, and a coil side surface 313. The coil end surfaces 311 and 312 and the coil side surface 313 are included in the outer surface of the coil 31. In the coil 31, one of the pair of end surfaces disposed in the axial direction α is a first coil end surface 311, and the other one of the pair of end surfaces disposed in the axial direction α is a second coil end surface 312. The first coil end surface 311 and the second coil end surface 312 are orthogonal to the axial direction α, and extend annularly around the coil center line Cc. In the present embodiment, a rectangular flat conductive wire is used as the winding that forms the coil 31. The first coil end surface 311 and the second coil end surface 312 are formed by a flat surface of a rectangular conductive wire.

The coil side surface 313 is in a state in which the coil side surface 313 extends over the first coil end surface 311 and the second coil end surface 312. In the coil 31, multiple annular portions 32 are connected in the axial direction α. The coil side surface 313 is formed by the outer surface of each of the multiple annular portions 32, and extends in the axial direction α as a whole. The coil side surface 313 is orthogonal to the radial direction β and extends in the circumferential direction γ.

The coil side surface 313 has multiple side surface portions 313a. The multiple side surface portions 313a are disposed in the circumferential direction γ. Two side surface portions 313a adjacent in the circumferential direction γ are connected to each other. The multiple side surface portions 313a include a flat surface extending in a direction orthogonal to the radial direction β, and a curved surface curved so as to swell toward outside in the radial direction, which is the outside of the radial direction β. The flat surfaces and the curved surfaces are arranged alternately in the circumferential direction γ, and multiple flat surfaces and multiple curved surfaces are provided. It is noted that all of the side surface portions 313a may be one of a flat surface and a curved surface.

In FIGS. 6 and 9, the first coil terminal 33 and the second coil terminal 34 extend in opposite directions from the coil 31 in the axial direction α. The first coil terminal 33 extends from the first coil end surface 311 toward a side opposed from the second coil end surface 312. The second coil terminal 34 extends from the second coil end surface 312 toward a side opposed from the first coil end surface 311. The first coil terminal 33 and the second coil terminal 34 are disposed in the circumferential direction γ. The first coil terminal 33 and the second coil terminal 34 are located apart from the coil center line Cc on the same side in the Z-direction. The first coil terminal 33 and the second coil terminal 34 are disposed in the X-direction. The first coil terminal 33 and the second coil terminal 34 are located at positions overlapping at least one of the multiple side surface portions 313a in the circumferential direction. With regard to the multiple side surface portions 313a, the side surface portion 313a overlapped by the first coil terminal 33 and the side surface portion 313a overlapped by the second coil terminal 34 are different from each other.

Figure 7:
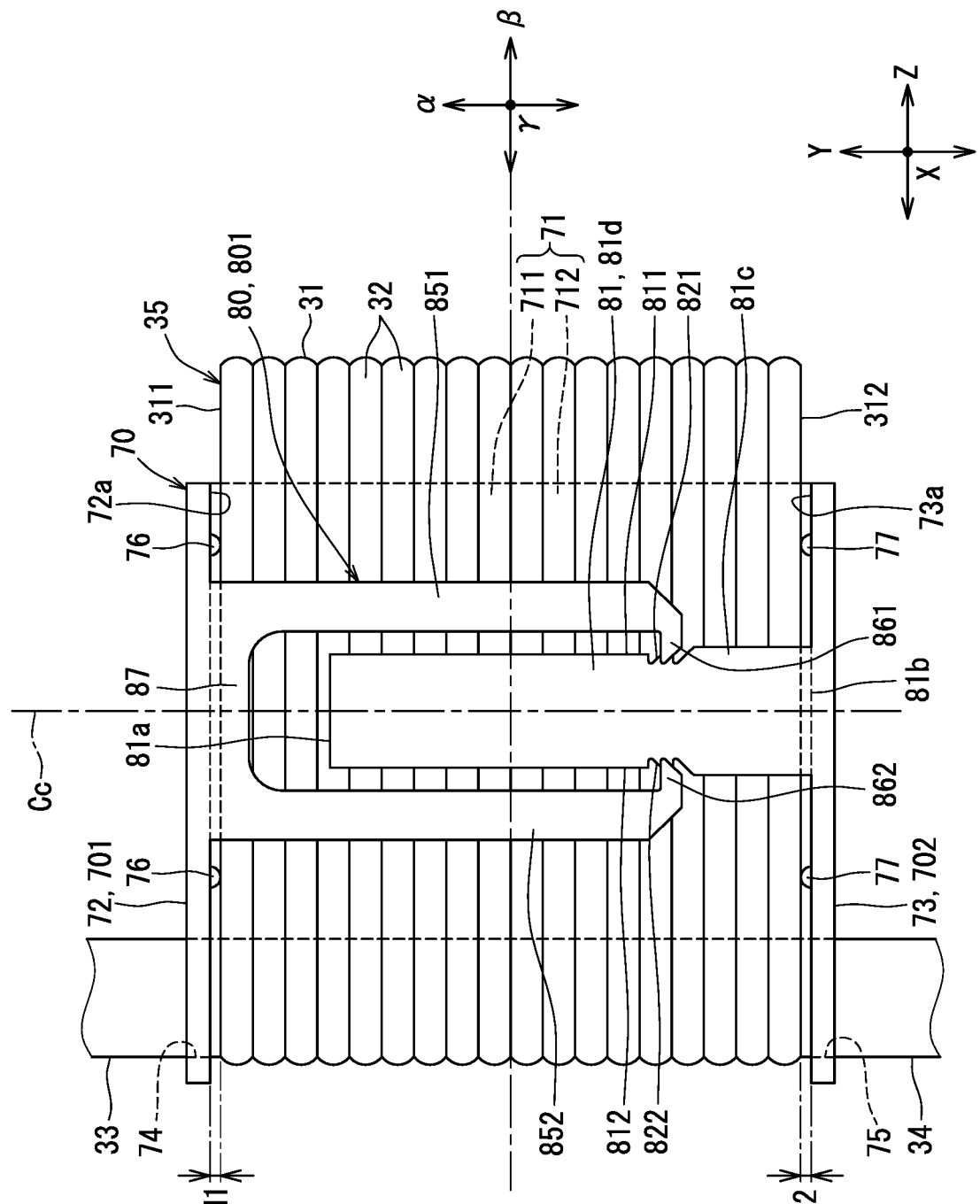
FIG. 7 illustrates a view of a bobbin and a coil body from a first snap-fit side.

As shown in FIGS. 6 and 7, the reactor unit 30 has a bobbin 70. The bobbin 70 holds the coil 31. The bobbin 70 has a function of restricting two adjacent annular portions 32 of the coil 31 from being separated from each other in the axial direction α. According to this function, the bobbin 70 prevents the formation of a gap between two adjacent annular portions 32.

The bobbin 70 has a body portion 71, a first flange portion 72, and a second flange portion 73. The body portion 71 is a cylindrical portion and extends in the axial direction α along the coil center line Cc. The body portion 71 is inserted into the hollow portion of the coil 31. In the coil 31, the winding is wound around the body portion 71.

Both the first flange portion 72 and the second flange portion 73 are portions formed in a plate shape extending from the body portion 71 in the radial direction β. The first flange portion 72 and the second flange portion 73 are located apart from each other in the axial direction α. For example, a first flange portion 72 is provided at one end of the body portion 71, and a second flange portion 73 is provided at the other end of the body portion 71. In the axial direction α, the coil 31 is provided between the first flange portion 72 and the second flange portion 73. The first flange portion 72 and the second flange portion 73 sandwich the coil 31 from both sides of the coil 31 in the axial direction α.

The first flange portion 72 has a first flange surface 72a. The first flange surface 72a is one of the pair of plate surfaces of the first flange portion 72, and faces the second flange portion 73. The second flange portion 73 has a second flange surface 73a. The second flange surface 73a is one of the pair of plate surfaces of the second flange portion 73, and faces the first flange portion 72. The first flange surface 72a and the second flange surface 73a face each other with the coil 31 interposed therebetween.

The bobbin 70 has two members being a first bobbin portion 701 and a second bobbin portion 702. The bobbin 70 is formed by assembling the first bobbin portion 701 and the second bobbin portion 702 with each other. The first bobbin portion 701 and the second bobbin portion 702 are made of resin material or the like and have insulation properties.

The first bobbin portion 701 has a first flange portion 72 and a first body 711. The first body 711 is a cylindrical portion and extends from the first flange portion 72 in the axial direction α. The second bobbin portion 702 has a second flange portion 73 and a second body 712. The second body 712 is a cylindrical portion and extends from the second flange portion 73 in the axial direction α. In the bobbin 70, the distal end surface of the first body 711 and the distal end surface of the second body 712 are stacked on top of each other. In the bobbin 70, a body portion 71 is formed by the first body 711 and the second body 712.

Figure 8:
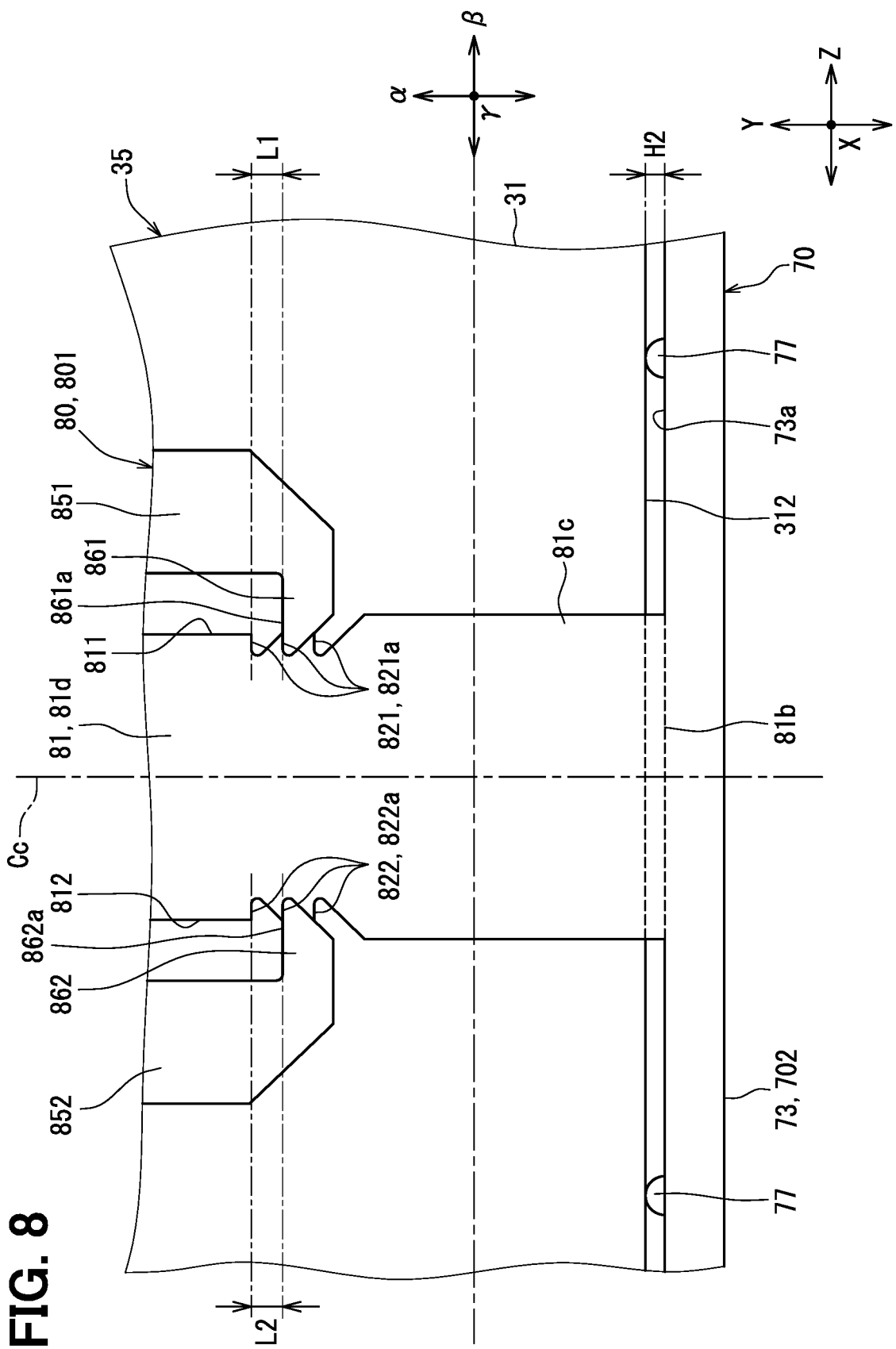
FIG. 8 is an enlarged view of the surrounding of a receiving surface and an engaging surface in FIG. 7.

As shown in FIGS. 7 to 9, the bobbin 70 has a first snap fit 801 and a second snap fit 802. The snap fits 801 and 802 connect the first flange portion 72 and the second flange portion 73. The snap fits 801 and 802 have a connecting base portion 81, a first arm portion 851, and a second arm portion 852. The connecting base portion 81 is provided with groove portions 821 and 822, and the arm portions 851 and 852 are provided with protruding portions 861 and 862. The connecting base portion 81 is provided on one of the first flange portion 72 and the second flange portion 73, and the arm portions 851 and 852 are provided on the other one of the first flange portion 72 and the second flange portion 73. In the snap fits 801 and 802, the protruding portions 861, 862 are engaged with the groove portions 821, 822, thereby connecting the connecting base portion 81 and the arm portions 851 and 852.

The snap fits 801 and 802 are provided outside the coil 31 in the radial direction β and face the coil side surface 313. The snap fits 801 and 802 are disposed in the circumferential direction γ. In the coil side surface 313, the side surface portion 313a facing the first snap fit 801 and the side surface portion 313a facing the second snap fit 802 are different from each other. The first snap fit 801 and the second snap fit 802 are disposed in the radial direction β via the coil center line Cc.

In the first snap fit 801 and the second snap fit 802, the positional relationship between the connecting base portion 81 and the arm portions 851 and 852 is reversed in the axial direction α. In the first snap fit 801, the first flange portion 72 is provided with arm portions 851, 852, and the second flange portion 73 is provided with a connecting base portion 81. In the first snap fit 801, the arm portions 851 and 852 are included in the first bobbin portion 701, and the connecting base portion 81 is included in the second bobbin portion 702. On the other hand, in the second snap fit 802, the first flange portion 72 is provided with the connecting base portion 81, and the second flange portion 73 is provided with the arm portions 851, 852. In the second snap fit 802, the connecting base portion 81 is included in the first bobbin portion 701, and the arm portions 851 and 852 are included in the second bobbin portion 702.

The first snap fit 801 and the second snap fit 802 have basically the same configuration except that the positional relationship between the connecting base part 81 and the arm portions 851 and 852 is reversed in the axial direction α. In the present embodiment, the first snap fit 801 will be described in detail, and the detailed description of the second snap fit 802 will be omitted.

As shown in FIG. 7, in the first snap fit 801, the connecting base portion 81 extends in the axial direction α from the second flange portion 73 toward the first flange portion 72. The connecting base portion 81 is shorter than the body portion 71 and longer than the second body 712 in the axial direction α. The connecting base portion 81 is formed in a plate shape as a whole. The plate surface of the connecting base portion 81 is a flat surface extending in a direction orthogonal to the radial direction β. The thickness direction of the connecting base portion 81 is the radial direction β. The width direction of the connecting base portion 81 is a tangential direction orthogonal to the radial direction β; however, in this embodiment, for convenience of explanation, the tangential direction of the connecting base portion 81 may be referred to as the radial direction β. With regard to the terminology of the tangential direction, the arm portions 851 and 852 are also referred to in the same manner.

The connecting base portion 81 has a base tip portion 81a and a base root portion 81b. The base tip portion 81a and the base root portion 81b extend in the circumferential direction γ. The base root portion 81b is arranged at a boundary portion between the connection base portion 81 and the second flange portion 73. The base tip portion 81a is located at a position spaced apart from the base root portion 81b in the axial direction α. The base tip portion 81a is located closer to the first flange portion 72 than the second flange portion 73 in the axial direction α.

The connecting base portion 81 has a first side surface 811 and a second side surface 812. The first side surface 811 and the second side surface 812 extend in the axial direction α, and extend over the base tip portion 81a and the base root portion 81b. The first side surface 811 and the second side surface 812 are spaced apart in the circumferential direction γ and face opposite to each other in the circumferential direction γ.

As shown in FIGS. 7 and 8, in the connection base portion 81, a first groove portion 821 is provided on the first side surface 811. The first groove portion 821 is a recessed portion recessed toward the second side surface 812, and is opened in the radial direction β so that a groove shape is formed. The first groove portion 821 has a first receiving surface 821a. The first receiving surface 821a is an engaging portion with which the first protruding portion 861 of the first arm portion 851 engages. The first receiving surface 821a is included in the inner surface of the first groove portion 821. A portion of the inner surface of the first groove portion 821 with which the first protruding portion 861 engages is the first receiving surface 821a. The first receiving surface 821a faces the base root portion 81b side in the axial direction α, and extends, for example, in a direction orthogonal to the axial direction α.

In the connecting base portion 81, the second groove portion 822 is provided on the second side surface 812. The second groove portion 821 is a recessed portion recessed toward the first side surface 811, and is opened in the radial direction β so that a groove shape is formed. The second groove portion 822 has a second receiving surface 822a. The second receiving surface 822a is an engaged portion with which the second protruding portion 862 of the second arm portion 852 engages. The second receiving surface 822a is included in the inner surface of the second groove portion 822. A portion of the inner surface of the second groove portion 822 with which the second protruding portion 862 engages is the second receiving surface 822a. The second receiving surface 822a faces the base root portion 81b in the axial direction α, and extends, for example, in a direction orthogonal to the axial direction α. The connecting base portion 81 supports the first receiving surface 821a and the second receiving surface 822a, and corresponds to a supporting portion.

Multiple first groove portions 821 and multiple second groove portions 822 are disposed in the axial direction α. The multiple first groove portions 821 are disposed along the first side surface 811. Therefore, the multiple first receiving surfaces 821a are arranged along the first side surface 811. In the axial direction α, each of the multiple first groove portions 821 has the same width dimension. Therefore, the multiple first receiving surfaces 821a are lined up at equal intervals in the axial direction α. The multiple second groove portions 822 are disposed along the second side surface 812. Therefore, the multiple second receiving surfaces 822a are disposed along the second side surface 812. In the axial direction α, each of the multiple second groove portions 822 has the same width dimension. Therefore, the multiple second receiving surfaces 822a are lined up at equal intervals in the axial direction α.

In the axial direction α, the installation intervals of the multiple first receiving surfaces 821a and the installation intervals of the multiple second receiving surfaces 822a are identical. For example, in a case where the distance between two adjacent first receiving surfaces 821a in the axial direction α is referred to as a first receiving distance L1; and the distance between two adjacent second receiving surfaces 822a is referred to as a second receiving distance L2, the first receiving distance L1 and the second receiving distance L2 are identical. In the present embodiment, the first receiving distance L1 is the same as the width of the first groove portion 821, and the second receiving distance L2 is the same as the width of the second groove portion 822.

The first receiving surface 821a and the second receiving surface 822a are provided side by side in the circumferential direction γ, and are spaced apart from each other in the circumferential direction γ. The first region where the multiple first receiving surfaces 821a are provided and the second region where the multiple second receiving surfaces 822a are provided are arranged side by side in the circumferential direction γ. The first region and the second region are located closer to the base root portion 81b than the base tip portion 81a in the axial direction α. The first region and the second region are located apart from the tip surface of the second body 712 toward the second flange portion 73.

In the connecting base portion 81, the width dimension in the circumferential direction γ is not uniform. For example, the connecting base portion 81 has a large-width portion 81c and a small-width portion 81d. The large-width portion 81c and the small-width portion 81d are disposed in the axial direction α. The large-width portion 81*c* is located between the base root portion 81*b* and the small-width portion 81*d*. For example, the large-width portion 81*c* extends from the base root portion 81*b* toward the base tip portion 81*a*, and the small-width portion 81*d* extends from the base tip portion 81*a* toward the base root portion 81*b*. In the circumferential direction γ, the width of the large-width portion 81*c* is larger than the width of the small-width portion 81*d*. A width boundary portion, which is a boundary portion between the large-width portion 81*c* and the small-width portion 81*d*, is located closer to the base root portion 81*b* than the base tip portion 81*a* in the axial direction α. For example, the width boundary portion is located at a distance from the tip surface of the second body 712 to the second flange portion 73. In the axial direction α, the length of the large-width portion 81*c* is smaller than the length of the small-width portion 81*d*.

In the connecting base portion 81, multiple first receiving surfaces 821*a* and multiple second receiving surfaces 822*a* are provided in the small-width portion 81*d*. The first region and the second region are located closer to the large-width portion 81*c* than the base tip portion 81*a* in the small-width portion 81*d*.

As shown in FIG. 7, in the first snap fit 801, the arm portions 851, 852 extend in the axial direction α from the first flange portion 72 toward the second flange portion 73. The arm portions 851 and 852 are shorter than the body portion 71 and longer than the first body 711 in the axial direction α. Each of the arm portions 851, 852 is formed in a plate shape as a whole. The respective plate surfaces of the arm portions 851 and 852 are flat surfaces extending in a direction orthogonal to the radial direction β. The thickness direction of each of the arm portions 851 and 852 is the radial direction β. In the circumferential direction γ, the arm portions 851 and 852 are thinner than the connecting base portion 81 as a whole. The arm portions 851 and 852 are elastically deformable. The arm portions 851 and 852 can be elastically deformed so as to bend at least in the circumferential direction γ. It is noted that the connecting base portion 81 may also be elastically deformable. However, it may be preferable that the arm portions 851 and 852 are more elastically deformable than the connecting base portion 81.

The first arm portion 851 and the second arm portion 852 are disposed in the circumferential direction γ. In the circumferential direction γ, the connecting base portion 81 is inserted between the first arm portion 851 and the second arm portion 852. The first arm portion 851 is located apart from the connecting base portion 81 in the circumferential direction γ, and faces the first side surface 811 in the circumferential direction γ. The second arm portion 852 is located at a position away from the connecting base portion 81 toward a side opposed from the first arm portion 851, and faces the second side surface 812 in the circumferential direction γ.

The first bobbin portion 701 has an arm connecting portion 87. The arm connecting portion 87 is provided between the first arm portion 851 and the second arm portion 852 in the circumferential direction γ, and connects the first arm portion 851 and the second arm portion 852. The arm connecting portion 87 extends in the axial direction α from the first flange portion 72 toward the second flange portion 73. The arm connecting portion 87 is located at a position spaced apart from the base tip portion 81*a* toward the first flange portion 72 in the axial direction α.

As shown in FIGS. 7 and 8, the first protruding portion 861 protrudes from the first arm portion 851 toward the connecting base portion 81 in the circumferential direction γ. The first protruding portion 861 is provided at the tip portion of the first arm portion 851. The first protruding portion 861 has a first engaging surface 861*a*. The first engaging surface 861*a* is an engaging portion that engages with the first receiving surface 821*a*, and corresponds to a first engaging portion. The first receiving surface 821*a* is a receiving portion that receives engagement with the first engaging surface 861*a*, and corresponds to a first receiving portion.

The first engaging surface 861*a* is included in the outer surface of the first protruding portion 861. A portion of the outer surface of the first protruding portion 861 that engages with the first receiving surface 821*a* is the first engaging surface 861*a*. The first engaging surface 861*a* faces toward the base tip portion 81*a* in the axial direction α, and extends, for example, in a direction orthogonal to the axial direction α. The first protruding portion 861 is in a state of being inserted into one of the multiple first groove portions 821. Therefore, the first engaging surface 861*a* is engaged with one of the multiple first receiving surfaces 821*a*. In the first snap fit 801, elastic deformation of the first arm portion 851 allows the first engaging surface 861*a* to engage and disengage from the first receiving surface 821*a*.

The second protruding portion 862 protrudes from the second arm portion 852 toward the connecting base portion 81 in the circumferential direction γ. The second protruding portion 862 is provided at the tip portion of the second arm portion 852. The second protruding portion 862 has a second engaging surface 862*a*. The second engaging surface 862*a* is an engaging portion that engages with the second receiving surface 822*a*, and corresponds to a second engaging portion. The second receiving surface 822*a* is a receiving portion that receives engagement with the second engaging surface 862*a*, and corresponds to a second receiving portion.

The second engaging surface 862*a* is included in the outer surface of the second protruding portion 862. A portion of the outer surface of the second protruding portion 862 that engages with the second receiving surface 822*a* is a second engaging surface 862*a*. The second engaging surface 862*a* faces the base tip portion 81*a* in the axial direction α, and extends, for example, in a direction orthogonal to the axial direction α. The second protruding portion 862 is in a state of being inserted into one of the multiple second groove portions 822. Therefore, the second engaging surface 862*a* is engaged with one of the multiple second receiving surfaces 822*a*. In the first snap fit 801, elastic deformation of the second arm portion 852 allows the second engaging surface 862*a* to engage and disengage from the second receiving surface 822*a*.

The first arm portion 851 is provided with a single first engaging surface 861*a*. The second arm portion 852 is provided with a single second engaging surface 862*a*. The first engaging surface 861*a* and the second engaging surface 862*a* are provided side by side in the circumferential direction γ.

Each of the first bobbin portion 701 and the second bobbin portion 702 has the connecting base portion 81 and the arm portions 851 and 852. In each of the first bobbin portion 701 and the second bobbin portion 702, the respective lengths of the connecting base portion 81 and the arm portions 851 and 852 in the axial direction α are approximately identical.

Figure 10:
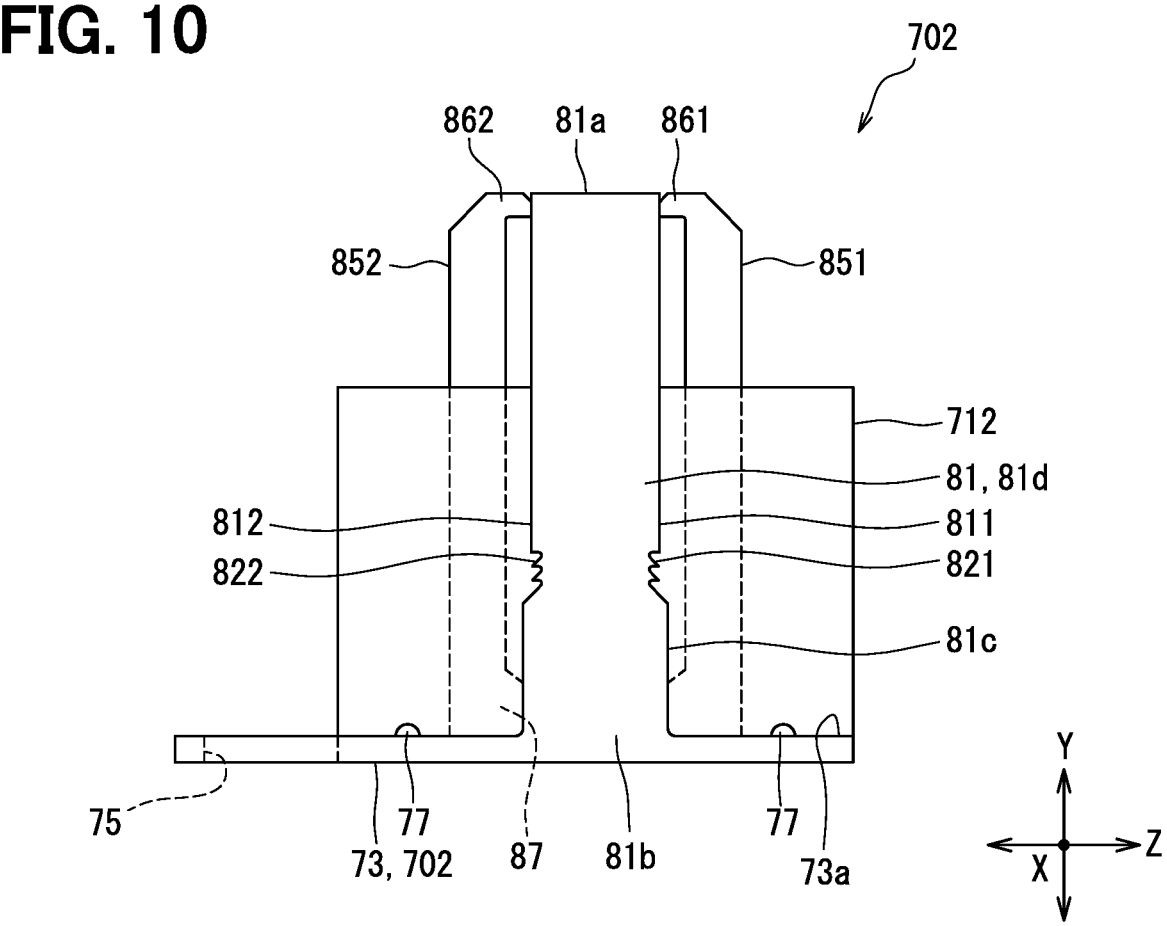
FIG. 10 illustrates a configuration of the second bobbin portion before being assembled to the first bobbin portion.

As shown in FIGS. 9 and 10, the second bobbin portion 702 has the connecting base portion 81 included in the first snap fit 801 and the arm portions 851 and 852 included in the second snap fit 802. In the second bobbin portion 702, the connecting base portion 81 and the arm portions 851, 852 are arranged to be opposite to each other with the coil center line Cc located between them in the radial direction β. The first bobbin portion 701 has a connecting base portion 81 included in the second snap fit 802 and the arm portions 851 and 852 included in the first snap fit 801. Also in the first bobbin portion 701, the connecting base portion 81 and the arm portions 851, 852 are arranged to be opposite to each other with the coil center line Cc located between them in the radial direction β.

The first bobbin portion 701 and the second bobbin portion 702 are members having the same shape and size, but are assembled in opposite directions. Therefore, the first snap fit 801 and the second snap fit 802 form a symmetrical shape. The first snap fit 801 and the second snap fit 802 are only opposite in the axial direction α, and form a rotationally symmetrical relationship. Since the first snap fit 801 and the second snap fit 802 form a symmetrical shape as described above, a configuration that allows the first flange portion 72 and the second flange portion 73 to be connected in parallel is achieved by the multiple receiving surfaces 821a, 822a.

As shown in FIGS. 7 to 9, the bobbin 70 has a first crush rib 76 and a second crush rib 77. The first crush rib 76 is provided on the first flange portion 72 and included in the first bobbin portion 701. The first crush rib 76 is a protruding rib provided on the first flange surface 72a, and protrudes from the first flange surface 72a toward the first coil end surface 311. The first crush rib 76 is provided between the first flange surface 72a and the first coil end surface 311. The first crush rib 76 is sandwiched between the first flange surface 72a and the first coil end surface 311, and is pressed against the first coil end surface 311.

The second crush rib 77 is provided on the second flange portion 73 and included in the second bobbin portion 702. The second crush rib 77 is a protruding rib provided on the second flange surface 73a, and protrudes from the second flange surface 73a toward the second coil end surface 312. The second crush rib 77 is provided between the second flange surface 73a and the second coil end surface 312. The second crush rib 77 is sandwiched between the second flange surface 73a and the second coil end surface 312, and is pressed against the second coil end surface 312.

As shown in FIGS. 7 and 8, in the axial direction α, the first rib height H1 of the first crush rib 76 is smaller than both of the first receiving distance L1 related to the first receiving surface 821a and the second receiving distance L2 related to the second receiving surface 822a. This first rib height H1 is the same as the distance between the first flange surface 72a and the first coil end surface 311. The rib heights H1 and H2 are the dimensions by which the crush ribs 76, 77 respectively protrude from the flange portions 72, 73, and correspond to protruding dimensions.

In the axial direction α, the second rib height H2 of the second crush rib 77 is smaller than both the first receiving distance L1 related to the first receiving surface 821a and the second receiving distance L2 related to the second receiving surface 822a. This second rib height H2 is the same as the distance between the first flange surface 72a and the first coil end surface 311. Further, the first rib height H1 and the second rib height H2 are approximately the same.

In a manufacturing process of manufacturing the reactor unit 30, an operator assembles the first bobbin portion 701 and the second bobbin portion 702 by sandwiching the coil 31 between the first flange portion 72 and the second flange portion 73 to form the bobbin 70. The crush ribs 76 and 77 are ribs that are deformed so as to be crushed by being pressed against the coil end surfaces 311 and 312 when the first bobbin portion 701 and the second bobbin portion 702 are assembled. The crush ribs 76 and 77 press the coil end surfaces 311 and 312 in a deformed state, and are sometimes referred to as crush ribs or pressing ribs. The crush ribs 76 and 77 become lower as the first bobbin portion 701 and the second bobbin portion 702 are assembled. Before the first bobbin portion 701 and the second bobbin portion 702 are assembled, the height dimensions of the crush ribs 76 and 77 are larger than both the first receiving distance L1 and the second receiving distance L2.

As shown in FIGS. 7 to 9, the multiple crush ribs 76 and 77 are provided on the flange surfaces 72a and 72b. The first crush rib 76 is provided at a position spaced apart from both the inner peripheral edge and the outer peripheral edge of the first flange surface 72a in the radial direction β. For example, the first crush rib 76 is located at an intermediate position between the inner circumferential edge and the outer circumferential edge of the first flange surface 72a in the radial direction β. The second crush rib 77 is provided at a position spaced apart from both the inner peripheral edge and the outer peripheral edge of the second flange surface 73a in the radial direction β. For example, the second crush rib 77 is located at an intermediate position between the inner circumferential edge and the outer circumferential edge of the second flange surface 73a in the radial direction β.

The crush ribs 76 and 77 are located apart from the snap fits 801 and 802 in the circumferential direction γ. That is, the crush ribs 76 and 77 are located at positions that do not overlap the snap fits 801 and 802 in the radial direction β. A pair of first crush ribs 76 and a pair of second crush ribs 77 are provided so as to be arranged with each other via a first snap fit 801 in the circumferential direction γ. The distance between the pair of first crush ribs 76 and the distance between the pair of second crush ribs 77 are both smaller than the inner diameter of the coil 31. The pair of first crush ribs 76 and the pair of second crush ribs 77 are located to be arranged with each other in the axial direction α. Further, a pair of first crush ribs 76 and a pair of second crush ribs 77 are similarly provided to the second snap fit 802 so as to be disposed in the circumferential direction γ with the second snap fit 802 interposed therebetween.

The bobbin 70 has a first inserting portion 74 and a second inserting portion 75. The first inserting portion 74 is provided on the first flange portion 72 and allows the first coil terminal 33 to be inserted therethrough. The first inserting portion 74 penetrates the first flange portion 72 in the axial direction α, and is formed by a cutout or an insertion hole. The first coil terminal 33 extends from the coil 31 through the first inserting portion 74 in the axial direction α. The second inserting portion 75 is provided on the second flange portion 73 and allows the second coil terminal 34 to be inserted therethrough. The second inserting portion 75 penetrates the second flange portion 73 in the axial direction α, and is formed by a cutout or an inserting hole. The second coil terminal 34 extends from the coil 31 through the second inserting portion 75 in the axial direction α.

The first inserting portion 74 and the second inserting portion 75 are located at positions in the coil side surface 313 that overlap any of the multiple side surface portions 313a in the radial direction β. With regard to the multiple side surface portions 313a, the side surface portion 313a overlapped by the first inserting portion 74 in the radial direction β and the side surface portion 313a overlapped by the second inserting portion 75 in the radial direction β are different from each other. Additionally, with regard to the multiple side surface portions 313a, the side surface portion 313a overlapped by the insertion parts 74 and 75 in the radial direction β and the side surface portion 313a overlapped by the snap fits 801 and 802 in the radial direction β are different from each other. In this configuration, the side surface portion 313a overlapped by the coil terminal 33 in the radial direction β and the side surface portion 313a overlapped by the snap fits 801 and 802 in the radial direction β are different from each other.

As shown in FIG. 6, the core 40 has a core inner peripheral portion 41, a core outer peripheral portion 42, a first block portion 43, and a second block portion 44. The core inner peripheral portion 41 extends in the axial direction α along the coil center line Cc. The core inner peripheral portion 41 is inserted into the hollow portion of the coil 31 by being inserted into the body portion 71 of the bobbin 70. In the coil 31, the winding is wound around the core inner peripheral portion 41. The core outer peripheral portion 42 extends in the axial direction α together with the core inner peripheral portion 41. A pair of the core outer peripheral portions 42 are provided side by side in the radial direction β with the core inner peripheral portion 41 interposed between the pair of the core outer peripheral portions 42.

The first block portion 43 and the second block portion 44 are disposed in the axial direction α with the core inner peripheral portion 41 and the core outer peripheral portion 42 interposed between the first block portion 43 and the second block portion 44. These block portions 43 and 44 both extend in the radial direction β and connect the core inner peripheral portion 41 and the core outer peripheral portion 42. In the axial direction α, one end of each of the core inner peripheral portion 41 and the core outer peripheral portion 42 is connected by the first block portion 43, and the other end of each of the core inner peripheral portion 41 and the core outer peripheral portion 42 is connected by the second block portion 44.

The core 40 has a first core end surface 40a, a second core end surface 40b, and a core side surface 40c. The first core end surface 40a, the second core end surface 40b, and the core side surface 40c are all included in the outer peripheral surface of the core 40. In the core 40, a part of the outer surface is the outer peripheral surface. The first core end surface 40a and the second core end surface 40b are disposed in the axial direction α, and face opposite to each other in the axial direction α. The first core end surface 40a is a portion of the outer surface of the first block portion 43 facing to a side opposed from the second block portion 44, and corresponds to a first opposing surface. The second core end surface 40b is a portion of the outer surface of the second block portion 44 facing a side opposed from the first block portion 43, and corresponds to a second opposing surface. The first core end surface 40a and the second core end surface 40b both extend in a direction orthogonal to the axial direction α and are parallel to each other.

A pair of core side surfaces 40c are provided side by side in the radial direction β. The pair of core side surfaces 40c face oppositely to each other in the radial direction β. The core side surface 40c is a portion of the outer surface of the core outer peripheral portion 42 facing a side opposed from the core inner peripheral portion 41. The core side surface 40c extends in a direction orthogonal to the radial direction β. The core side surface 40c extends over the first core end surface 40a and the second core end surface 40b in the axial direction α.

The core 40 has two members being a first core portion 45 and a second core portion 46. The core 40 is formed by the first core portion 45 and the second core portion 46 being magnetically connected to each other. The first core portion 45 has a first block portion 43, a first inner peripheral portion 451, and a first outer peripheral portion 452. The first inner peripheral portion 451 and the first outer peripheral portion 452 extend from the first block portion 43 in the axial direction α. A pair of first outer peripheral portions 452 are included in the first core portion 45. The second core portion 46 has a second block portion 44, a second inner peripheral portion 461, and a second outer peripheral portion 462. The second inner peripheral portion 461 and the second outer peripheral portion 462 extend from the second block portion 44 in the axial direction α. A pair of second outer peripheral portions 462 are included in the second core portion 46. The first core portion 45 and the second core portion 46 form an E-shape as a whole, and are sometimes referred to as an E-core.

In a case where: the tip end surface of the first inner peripheral portion 451 is referred to as a first inner end surface 451a; and the tip end surface of the second inner peripheral portion 461 is referred to as a second inner end surface 461a, the first inner end surface 451a and the second inner end surface 461a stack on top of each other in the core 40. In the core 40, the core inner peripheral portion 41 is formed by the first inner peripheral portion 451 and the second inner peripheral portion 461. Both of the first inner end surface 451a and the second inner end surface 461a extend in a direction orthogonal to the axial direction α, and are parallel to the first core end surface 40a and the second core end surface 40b.

In a case where: the tip end surface of the first outer peripheral portion 452 is referred to as a first outer end surface 452a; and the tip end surface of the second outer peripheral portion 462 is referred to as a second outer end surface 461b, the first outer end surface 452a and the second outer end surface 462a stack on top of each other in the core 40. In the core 40, the core outer peripheral portion 42 is formed by the first outer peripheral portion 452 and the second outer peripheral portion 462. Both of the first outer end surface 452a and the second outer end surface 462a extend in a direction orthogonal to the axial direction α, and are parallel to the first core end surface 40a and the second core end surface 40b.

The reactor unit 30 includes a reactor case 90 and a plate spring 110. The reactor case 90 stores the coil 31, the core 40, the bobbin 70, and the plate spring 110, and corresponds to a storage case. The reactor case 90 has a first case surface 91, a second case surface 92, and a case extending surface 93.

The first case surface 91, the second case surface 92, and the case extending surface 93 are all included in the inner surface of the reactor case 90. The first case surface 91 is a portion of the inner surface of the reactor case 90 that faces the first core end surface 40a, and corresponds to a first facing surface. The second case surface 92 is a portion of the inner surface of the reactor case 90 that faces the second core end surface 40b, and corresponds to a second facing surface. The first case surface 91 and the second case surface 92 are disposed in the axial direction α, and face each other with the core 40 interposed therebetween in the axial direction α. The first case surface 91 and the second case surface 92 extend in a direction orthogonal to the axial direction α.

The case extending surface 93 is a portion of the inner surface of the reactor case 90 that faces the core side surface 40c. The case extending surface 93 extends in the axial direction α, which is the direction in which the first case surface 91 and the second case surface 92 are lined up, and corresponds to an extending surface. A pair of the case extending surfaces 93 are provided side by side in the radial direction β. A pair of the case extending surfaces 93 face to each other in the radial direction β with the core 40 interposed therebetween. The case extending surface 93 extends in a direction orthogonal to the radial direction β. The case extending surface 93 extends over the first case surface 91 and the second case surface 92 in the axial direction α.

The plate spring 110 presses the first core portion 45 and the second core portion 46 in a direction closer to each other, and corresponds to a pressing spring. The plate spring 110 is a spring member made of a metal material or the like, and biases the first core portion 45 and the second core portion 46 in a direction closer to each other by a restoring force generated by elastic deformation. The plate spring 110 is formed by bending a plate-shaped member, and is bent so as to expand in the thickness direction of the plate spring 110 as a whole. The core 40 is in a state of being inserted inside the plate spring 110. The plate spring 110 extends along the outer peripheral surface of the core 40, and faces the first core end surface 40a, the second core end surface 40b, and the core side surface 40c.

The plate spring 110 has a first spring portion 111, a second spring portion 112, and a support spring portion 113. The first spring portion 111, the second spring portion 112, and the support spring portion 113 are formed into a plate shape as a whole. The first spring portion 111 and the second spring portion 112 are disposed in the axial direction α with the core 40 interposed therebetween. The first spring portion 111 and the second spring portion 112 are provided with their respective plate surfaces being in a direction orthogonal to the axial direction α.

The support spring portion 113 supports the first spring portion 111 and the second spring portion 112. The support spring portion 113 connects the first spring portion 111 and the second spring portion 112. The first spring portion 111 extends from one end of the support spring portion 113, and the second spring section 112 extends from the other end of the support spring portion 113. The support spring portion 113 extends along the inner surface of the reactor case 90. The support spring portion 113 extends over the first case surface 91 and the second case surface 92.

The support spring portion 113 has a first support portion 113a, a second support portion 113b, and a connection support portion 113c. The connection support portion 113c connects the first support portion 113a and the second support portion 113b. The connection support portion 113c is provided between the core side surface 40c and the case extending surface 93. The connection support portion 113c extends in the axial direction α along the case extending surface 93, and is overlapped with the case extending surface 93. The first support portion 113a extends from one end of the connection support portion 113c, and the second support portion 113b extends from the other end of the connection support portion 113c.

The first support portion 113a supports the first spring portion 111. The first support portion 113a is provided between the first core end surface 40a and the first case surface 91. The first support portion 113a extends in the radial direction β from the connection support portion 113c. The second support portion 113b supports the second spring portion 112. The second support portion 113b is provided between the second core end surface 40b and the second case surface 92. The second support portion 113b extends in the radial direction β from the connection support portion 113c. The first support portion 113a and the second support portion 113b face each other with the core 40 interposed therebetween in the axial direction α.

The first spring portion 111 is provided on a side opposed from the second core portion 46 with the first core portion 45 interposed between the first spring portion 111 and the second core portion 46 in the axial direction α. The first spring portion 111 faces the first core end surface 40a and extends along the first core end surface 40a. The first spring portion 111 presses the first core portion 45 toward the second core portion 46. The first spring portion 111 as a whole is folded back toward the connection support portion 113c with respect to the first support portion 113a. The first spring portion 111 extends in the radial direction β from the first support portion 113a toward the connection support portion 113c. The first spring portion 111 is provided between the first support portion 113a and the first core end surface 40a.

The first spring portion 111 as a whole has a curved shape that swells toward the first core end surface 40a. The first spring portion 111 has a first top portion 111a. The first top portion 111a is a portion of the first spring portion 111 that is closest to the first core end surface 40a. In other words, the first top portion 111a is a portion of the first spring portion 111 that is furthest apart from the first support portion 113a. In the first spring portion 111, the first top portion 111a is pressed against the first core end surface 40a. In the first spring portion 111, at least the first top portion 111a is in contact with the first core end surface 40a.

The second spring portion 112 is provided on a side opposed from the first core portion 45 with the second core portion 46 interposed between the second spring portion 112 and the first core portion 45 in the axial direction α. The second spring portion 112 faces the second core end surface 40b and extends along the second core end surface 40b. The second spring portion 112 presses the second core portion 46 toward the first core portion 45. The second spring portion 112 as a whole is folded back toward the connection support portion 113c with respect to the second support portion 113b. The second spring portion 112 extends in the radial direction β from the second support portion 113b toward the connection support portion 113c. The second spring portion 112 is provided between the second support portion 113b and the second core end surface 40b.

The second spring portion 112 as a whole has a curved shape that swells toward the second core end surface 40b. The second spring portion 112 has a second top portion 112a. The second top portion 112a is a portion of the second spring portion 112 that is closest to the second core end surface 40b. In other words, the second top portion 112a is a portion of the second spring portion 112 that is furthest apart from the second support portion 113b. In the second spring portion 112, the second top portion 112a is pressed against the second core end surface 40b. In the second spring portion 112, at least the second top portion 112a is in contact with the second core end surface 40b.

The plate spring 110 is stored between the inner surface of the reactor case 90 and the core 40 in a state where at least a portion of the plate spring 110 is elastically deformed. The plate spring 110 is elastically deformed such that the first top portion 111a approaches the first support portion 113a and the second top portion 112a approaches the second support portion 113b. In the plate spring 110, at least the first spring portion 111 is elastically deformed. The plate spring 110 biases the first core portion 45 toward the second core portion 46 by the restoring force of the first spring portion 111. In the plate spring 110, at least the second spring portion 112 is elastically deformed. The plate spring 110 biases the second core portion 46 toward the first core portion 45 by the restoring force of the second spring portion 112. The first spring portion 111 and the second spring portion 112 are in a state where at least a portion of each of the first spring portion 111 and the second spring portion 112 is elastically deformed.

The following describes a method of manufacturing the reactor unit 30. The manufacturing process of the reactor unit 30 includes a bobbin process in which the bobbin 70 is attached to the coil 31 and a spring process in which the plate spring 110 is attached to the core 40. The bobbin process includes a method of manufacturing the bobbin 70, and is also a process of manufacturing the bobbin 70. The spring process is a process in which the coil body 35, the core 40, the bobbin 70, and the plate spring 110 are stored in the reactor case 90.

In the bobbin process, the operator attaches the first bobbin portion 701 and the second bobbin portion 702 to the coil body 35. The operator assembles the first bobbin portion 701 and the second bobbin portion 702 so that the first body 711 fits into the hollow portion of the coil 31 and the second body 712 fits into the hollow portion of the coil 31. The operator inserts the connecting base portion 81 of the second bobbin portion 702 between the arm portions 851 and 852 of the first bobbin portion 701 in order to form the first snap fit 801. Additionally, the operator inserts the connecting base portion 81 of the second bobbin portion 702 between the arm portions 851 and 852 of the first bobbin portion 701 to form the second snap fit 802.

The operator presses the flange portions 72, 73 against the coil 31 and deforms the crush ribs 76, 77 so as to crush them with the coil end surfaces 311 and 312, while pressing the receiving surfaces 821a, 822a of the engaging surfaces 861a and 862a in the snap fits 801 and 802. By deforming the crush ribs 76, 77 as described above, it is unlikely to form a gap for play between the first flange portion 72 and the second flange portion 73. Therefore, a gap is less likely to be formed between two adjacent annular portions 32 in the coil 31, and foreign matter is less likely to enter between these annular portions 32.

In the spring process, the operator attaches the core 40 to the coil body 35 with the bobbin 70 attached. The operator assembles the first core portion 45 and the second core portion 46 to sandwich the coil body 35 and bobbin 70 to form the core 40. The operator performs a mounting operation for mounting the plate spring 110 on the core 40 and a storing operation for storing, for example, the plate spring 110 and the core 40 in the reactor case 90. The operator elastically deforms the plate spring 110 during at least one of the mounting operation and the storing operation. Thereby, the plate spring 110 is stored in the reactor case 90 in an elastically deformed state.

(Configuration Group A)

According to the present embodiment described above, the first sensor element 52 and the second sensor element 53 are disposed in the radial direction β. Therefore, in the current sensor 51 spaced apart from the coil 31 in the axial direction α, since the short curved portion Mcb is relatively short in the coil magnetic flux Mc, the short curved portion Mcb is likely to exist at a position apart from the first sensor element 52 and the second sensor element 53 in the radial direction β. In other words, the first sensor element 52 and the second sensor element 53 are unlikely to be disposed along the short curved portion Mcb. Therefore, it is possible to inhibit the direction of the coil magnetic flux Mc detected by the first sensor element 52 and the direction of the coil magnetic flux Mc detected by the second sensor element 53 from being opposite to each other. That is, it is possible to suppress the coil magnetic flux Mc from being included as noise in the respective detection values detected by the sensor elements 52 and 53. Therefore, the detection accuracy of the current detected by the current sensor 51 can be enhanced.

In the present embodiment, since the current sensor 51 is a coreless type that does not have a magnetic flux collecting core, the respective detection values detected by the sensor elements 52 and 53 are easily influenced by the coil magnetic flux Mc. However, according to the present embodiment, since there is a low possibility that the coil magnetic flux Mc is included in the respective detection values detected by the sensor elements 52 and 53, it is possible to suppress these detection values from being influenced by the coil magnetic flux Mc.

According to the present embodiment, in the current sensor 51, the first sensor element 52 and the second sensor element 53 are provided at positions spaced apart from the coil 31 in the axial direction α. Therefore, the probability that the first sensor element 52 and the second sensor element 53 are arranged along the short curved portion Mcb can be reduced. Therefore, with regard to the multiple current sensors 51 disposed in the radial direction β at positions spaced apart from the coil 31 in the axial direction α, the number of the current sensors 51 in which the first sensor element 52 and the second sensor element are arranged along the short curved portion Mcb can be reduced as many as possible.

According to the present embodiment, the first sensor element 52 and the second sensor element 53 are provided between the coil 31 and the connecting portion 61 in the axial direction α. With this configuration, the region between the connecting portion 61 and the coil 31, which tends to become a dead space, can be effectively used as an installation space for the first sensor element 52 and the second sensor element 53. In other words, in the limited internal space 20S of the device case 20, the current sensor 51 can be placed in an area that is likely to become a dead space. Therefore, it is possible to downsize the device case 20 and the electric power converter 10.

According to present embodiment, the element center line Cs extending in the radial direction β through the center of the sensor elements 52 and 53 is orthogonal to the coil center line Cc extending in the axial direction α through the center of the coil 31. In the coil magnetic flux Mc, since the portion extending in the radial direction β along the element center line Cs is the shortest, the element center line Cs and the coil center line Cc are orthogonal to each other. Therefore, the possibility of the first sensor element 52 and the second sensor element 53 being disposed along the coil magnetic flux Mc can be minimized.

In the present embodiment, the coil magnetic flux Mc that is flattened to extend in the axial direction α has the smallest dimension of length in the radial direction β. Therefore, according to this embodiment, the first sensor element 52 and the second sensor element 53 are disposed in the radial direction β. In this configuration, for example, compared to a configuration in which the first sensor element 52 and the second sensor element 53 are located at positions spaced apart from each other in the axial direction α, it is possible to reduce the possibility of the first sensor element 52 and the second sensor element 53 being arranged along the coil magnetic flux Mc. In other words, the first sensor element 52 and the second sensor element 53 can be arranged at positions that are hardly to be affected by noise caused by the coil magnetic flux Mc.

In the present embodiment, the current sensors 51 are disposed in the radial direction β at positions spaced apart from the coil 31 in the axial direction α. In this configuration, since the current sensor 51 and the coil 31 are disposed in the widthwise direction of the device case 20, it becomes difficult to increase the separation distance between the current sensor 51 and the coil 31. Therefore, the coil magnetic flux Mc easily reaches the current sensor 51, and the coil values Dc1 and Dc2 respectively detected by the sensor elements 52 and 53 tend to become larger. Therefore, there is a concern that the detection accuracy of the current sensor 51 is likely to decrease due to the coil values Dc1 and Dc2.

On the other hand, according to the present embodiment, since the first sensor element 52 and the second sensor element 53 are disposed in the radial direction β, it is possible to inhibit the situation in which the first sensor element 52 and the second sensor element 53 are disposed along the coil magnetic flux Mc. Thereby, even if the separation distance between the current sensor 51 and the coil 31 in the device case 20 is small, it is possible to inhibit the situation in which the detection accuracy of the current sensor 51 decreases due to the coil values Dc1 and Dc2.

According to the present embodiment, the reactor region 20Sb and the sensor region 20Sc are arranged in the axial direction α. With this configuration, it is possible to reduce the possibility of the first sensor element 52 and the second sensor element 53 being arranged along the coil magnetic flux Mc for any of the multiple current sensors 51 arranged in the sensor region 20Sc.

According to the present embodiment, at least one of the multiple current sensors 51 stored in the sensor region 20Sc is provided at a position overlapping the reactor region 20Sb in the axial direction α. With this configuration, for at least one of the multiple current sensors 51, the first sensor element 52 and the second sensor element 53 can be prevented from arranged along the coil magnetic flux Mc with a higher probability. Thereby, the influence of noise caused by the coil magnetic flux Mc can be absolutely suppressed.

In particular, regarding the three current sensors 51 respectively provided for the three phases being U-phase, V-phase, and W-phase, at least one current sensor 51 is provided at a position overlapping the reactor region 20Sb in the axial direction α. Therefore, with regard to one of the three phases at which such a current sensor 51 is provided, it is possible to enhance the detection accuracy of the current absolutely.

According to the present embodiment, inside the device case 20, the power region 20Sa is provided in a position disposed in the radial direction β with respect to the reactor region 20Sb. In other words, the power region 20Sa is provided at a position disposed in the axial direction α with respect to the sensor region 20Sc. With this configuration, in the internal space 20S, a region that is disposed in the radial direction β with respect to the reactor region 20Sb and in the axial direction α with respect to the sensor region 20Sc can be effectively used as the power region 20Sa. Therefore, electrical components such as the power unit 21, the reactor unit 30, and the current sensor 51 can be effectively disposed inside the device case 20 without increasing the size of the electric power converter 10.

According to the present embodiment, the sensor region 20Sc is provided at a position that overlaps both of at least a portion of the reactor region 20Sb and at least a portion of the power region 20Sa in the axial direction α. With this configuration, the degree of freedom regarding the positional relationship between the reactor region 20Sb and the power region 20Sa can be increased with regard to a region adjacent to the sensor region 20Sc in the axial direction α. Thereby, the degree of freedom regarding the arrangement of electrical components such as the power unit 21, the reactor unit 30, and the current sensor 51 inside the device case 20 can be increased.

(Configuration Group B)

According to the present embodiment, the first flange portion 72 and the second flange portion 73 are connected by the snap fits 801, 802. In this configuration, the crush ribs 76, 77 prevent the coil 31 from deformation so as to extend in the axial direction α. Therefore, in the coil 31, two adjacent annular portions 32 are less likely to be separated from each other in the axial direction α. As a result, it is possible to prevent foreign matter from entering between the two adjacent annular portions 32.

Moreover, the crush ribs 76, 77 are provided on the flange portions 72, 73 protrude toward the coil end surfaces 311, 312, and are pressed against the coil end surfaces 311, 312. With this configuration, the crush ribs 76, 77 can suppress the play of the coil 31 that is smaller than the receiving distances L1, L2 between the first flange portion 72 and the second flange portion 73. In addition, with this configuration, even if a small manufacturing tolerance occurs in the reactor unit 30 or the bobbin 70, this tolerance can be absorbed by the crush ribs 76, 77.

Furthermore, the rib heights H1, H2 are smaller than the receiving distances L1, L2. In this configuration, when the crush ribs 76, 77 restrict the extension of the coil 31, the rib heights H1, H2 are set to a necessary minimum dimension. This can prevent the crush ribs 76, 77 from deforming unintentionally after manufacturing the reactor unit 30 and causing play in the coil 31 due to the rib heights H1, H2 being excessively large.

According to the present embodiment, in the connecting base portion 81, the first engaging surface 861a is engaged with the first receiving surface 821a that is opened toward one side of the circumferential direction γ; and the second engaging surface 862a is engaged with the second receiving surface 821a that is opened toward the other side of the circumferential direction γ. In this configuration, for example, as compared with a configuration in which only one of the first receiving surface 821a and the second receiving surface 822a is provided at the connecting base portion 81, the situation in which the arm portions 851, 852 are relatively tilted to the connecting base portion 81 is less likely to occur. In other words, the flange portions 72, 73 are less likely to be tilted to the coil end surfaces 311 and 312. Therefore, the state in which the coil 31 is sandwiched between the flange portions 72, 73 can be maintained by the snap fits 801, 802.

According to the present embodiment, the crush ribs 76, 77 are arranged as a pair through the snap fits 801, 802 in the circumferential direction γ. In this configuration, the situation in which the flange portions 72, 73 are tilted to the coil end surfaces 311, 312 is less likely to occur as compared with, for example, a configuration in which the crush ribs 76, 77 are provided on one side of the snap fits 801, 802 in the circumferential direction γ. Therefore, the pair of crush ribs 76, 77 can evenly hold the coil 31 as a whole in the circumferential direction γ.

According to the present embodiment, the multiple receiving surfaces 821a, 821b are provided at positions closer to the base root portion 81b than the base tip portion 81a in the axial direction α. With this configuration, the portion of the connecting base portion 81 closer to the base root portion 81b than the multiple receiving surfaces 821a, 822a can be made as short as possible, so that the situation of the strength of this portion being insufficient is unlikely to occur. The snap fits 801, 802 allow the coil 31 to be held evenly. Additionally, in this configuration, new receiving surfaces 821a, 822a can be added between the multiple receiving surfaces 821a, 822a and the base tip portion 81a in the connecting base portion 81 according to the length dimension of the coil 31. Therefore, the versatility of the snap fits 801 and 802 can be enhanced.

According to the present embodiment, the arm portions 851, 852 are thinner than the connecting base portion 81 in the circumferential direction γ. Therefore, it is possible to realize a configuration in which the connecting base portion 81 is more likely to be elastically deformed than the arm portions 851, 852 when the engaging surfaces 861a, 862a and the receiving surfaces 821a, 821b are engaged. Therefore, in the process of manufacturing the reactor unit 30, when the operator engages the engaging surfaces 861a, 862a and the receiving surfaces 821a, 821b, the first bobbin portion 701 and the second bobbin portion 702 are assembled with a light burden. In this way, the work burden on the operator when assembling the first bobbin portion 701 and the second bobbin portion 702 can be reduced.

According to the present embodiment, the receiving surfaces 821a and 822a are provided at the small-width portion 81d as one of the large-width portion 81c and the small-width portion 81d in the connecting base portion 81. In this configuration, when the engaging surfaces 861a, 862a pass through the receiving surfaces 821a, 822a and move excessively toward the large-width portion 81c, the protruding portions 861, 862 come into contact with the large-width portion 81c. Therefore, in the snap fits 801, 802, the large-width portion 81c can function as a stopper that prevents the receiving surfaces 821a, 822a and the engaging surfaces 861a, 862a from coming across each other.

According to present embodiment, the first snap fit 801 and the second snap fit 802 have the same receiving distances L1, L2. With this configuration, it is unlikely that the separation distance between the first flange portion 72 and the second flange portion 73 on the first snap fit 801 side is different from the separation distance between the first flange portion 72 and the second flange portion 73 on the second snap fit 802 side in the radial direction β. Therefore, it is possible to uniformly prevent foreign matter from entering a location between the two adjacent annular portions 32 in the entire circumferential direction γ. Further, with this configuration, the tolerance absorbed by the crush ribs 76, 77 can be equalized between the first snap fit 801 side and the second snap fit 802 side in the radial direction β. Therefore, the tolerance can be absorbed evenly in the entire circumferential direction γ.

According to the present embodiment, among the multiple side surface portions 313a in the coil side surface 313, the side surface portion 313a overlapping the snap fits 801 and 802 in the radial direction β is different from the side surface portion 313a overlapping the coil terminals 33, 34 in the axial direction α. With this configuration, it becomes easier to arrange the snap fits 801, 802 and the coil terminals 33, 34 so that they do not interfere with each other. In this case, the degree of freedom regarding the shape and size of the snap fits 801, 802 and the coil terminals 33, 34 is enhanced, so the strength of the snap fits 801, 802 can be sufficiently increased.

According to the present embodiment, one of the first bobbin portion 701 and the second bobbin portion 702 is provided with the receiving surfaces 821a, 822a, which are included in the first snap fit 801, and the first inserting portion 74. The other one of the first bobbin portion 701 and the second bobbin portion 702 is provided with the receiving surfaces 821a and 822a, which are included in the second snap fit 802, and the second inserting portion 75. With this configuration, the load applied to the snap fits 801, 802 is easily divided equally between the first bobbin portion 701 and the second bobbin portion 702, and the possibility of strength reduction due to the inserting portions 74, 75 is reduced between the first bobbin portion 701 and the second bobbin portion 702. Therefore, it is possible to suppress the concentration of load on one of the first bobbin portion 701 and the second bobbin portion 702 and the concentration of decrease in strength on one of the first bobbin portion 701 and the second bobbin portion 702. In this way, it is possible to prevent an abnormality from occurring more easily in one of the first bobbin portion 701 and the second bobbin portion 702 than the other one of the first bobbin portion 701 and the second bobbin portion 702.

In the snap fits 801, 802, the receiving surfaces 821a, 822a are provided at the small-width portion 81d, which is a location one step down from the large-width portion 81c. Therefore, the load applied to the receiving surfaces 821a, 822a is likely to be applied to the entire large-width portion 81c. Therefore, in the snap fits 801 and 802, the overall strength of the connecting base portion 81, which is the portion where the receiving surfaces 821a, 822a are provided, can be enhanced.

(Configuration Group C)

According to the present embodiment, the first core portion 45 and the second core portion 46 are pressed by the plate spring 110 in respective directions toward each other. In this configuration, since the plate spring 110 provides the adhesion force that brings the first core portion 45 and the second core portion 46 into close contact, the plate spring 110 can inhibit the separation between the first core portion 45 and the second core portion 46 in the axial direction α.

Moreover, in the plate spring 110, the first spring portion 111 and the second spring portion 112 are connected and supported by the support spring portion 113. The first spring portion 111 presses the first core portion 45 toward the second core portion 46, and the second spring portion 111 presses the second core portion 46 toward the first core portion 45. In this configuration, even if a manufacturing tolerance occurs in the length dimension of the first core portion 45 and the second core portion 46 in the axial direction α, the tolerance can be absorbed by the elastic deformation of at least one of the first spring portion 111, the second spring portion 112, and the support spring portion 113. it is possible to inhibit a situation in which the play of the core 40 occurs between the first spring portion 111 and the second spring portion 112 and a situation in which the core portions 45, 46 cannot be incorporated between the first spring portion 111 and the second spring portion 112. Therefore, it is possible to realize a configuration in which the elastic force of the plate spring 110 can be easily used to bring the first core portion 45 and the second core portion 46 into close contact with each other.

According to the present embodiment, in the first core portion 45, the first core end surface 40a extending parallel to the first inner end surface 451a and the first outer end surface 452a is pressed by the first spring portion 111. Additionally, in the second core portion 46, the second core end surface 40b extending parallel to the second inner end surface 461a and the second outer end surface 462a is pressed by the second spring portion 112. With this configuration, the pressing force with which the spring portions 111, 112 press the core end surfaces 40a, 40b is difficult to be dispersed in the radial direction β. Therefore, the biasing force exerted by the plate spring 110 can be efficiently used to bring the first core portion 45 and the second core portion 46 into close contact.

According to the present embodiment, the support spring portion 113 extends along the first outer peripheral portion 452 and the second outer peripheral portion 462 so as to straddle the boundary portion between the first outer peripheral portion 452 and the second outer peripheral portion 462 in the axial direction α. In this configuration, since the support spring portion 113 is arranged on a side opposed from the coil 31 provided with the core outer peripheral portion 42 between the coil 31 and the support spring portion 113 in the radial direction β, it is difficult for the support spring portion 113 and the coil 31 to interfere with each other. Additionally, with this configuration, when the operator stores the core 40 and coil 31 in the reactor case 90 in the manufacturing process of the reactor unit 30, it is easier for the operator to grasp the support spring portion 113 and the core outer peripheral portion 42 together. Therefore, it is possible to reduce the work load on the operator when storing the core 40 and the coil 31 in the reactor case 90.

According to the present embodiment, the first spring portion 111 presses the first support portion 113a toward the first case surface 91 in addition to pressing the first core portion 45 toward the second core portion 46. Additionally, the second spring portion 112 presses the second support portion 113b toward the second case surface 92 in addition to pressing the second core portion 46 toward the first core portion 45. With this configuration, the movement of the core 40 in the axial direction α between the first case surface 91 and the second case surface 92 can be suppressed by the biasing force of the plate spring 110.

According to the present embodiment, in the support spring portion 113, the connection support portion 113c, which connects the first spring portion 111 and the second spring portion 112, is stacked on the case extending surface 93. In this configuration, the case extending surface 93 prevents the plate spring 110 from shifting in the radial direction β with respect to the reactor case 90. Therefore, the core 40 and the plate spring 110 can be prevented from being shifted in the radial direction β with respect to the reactor case 90.

(First Modification)

Figure 11:
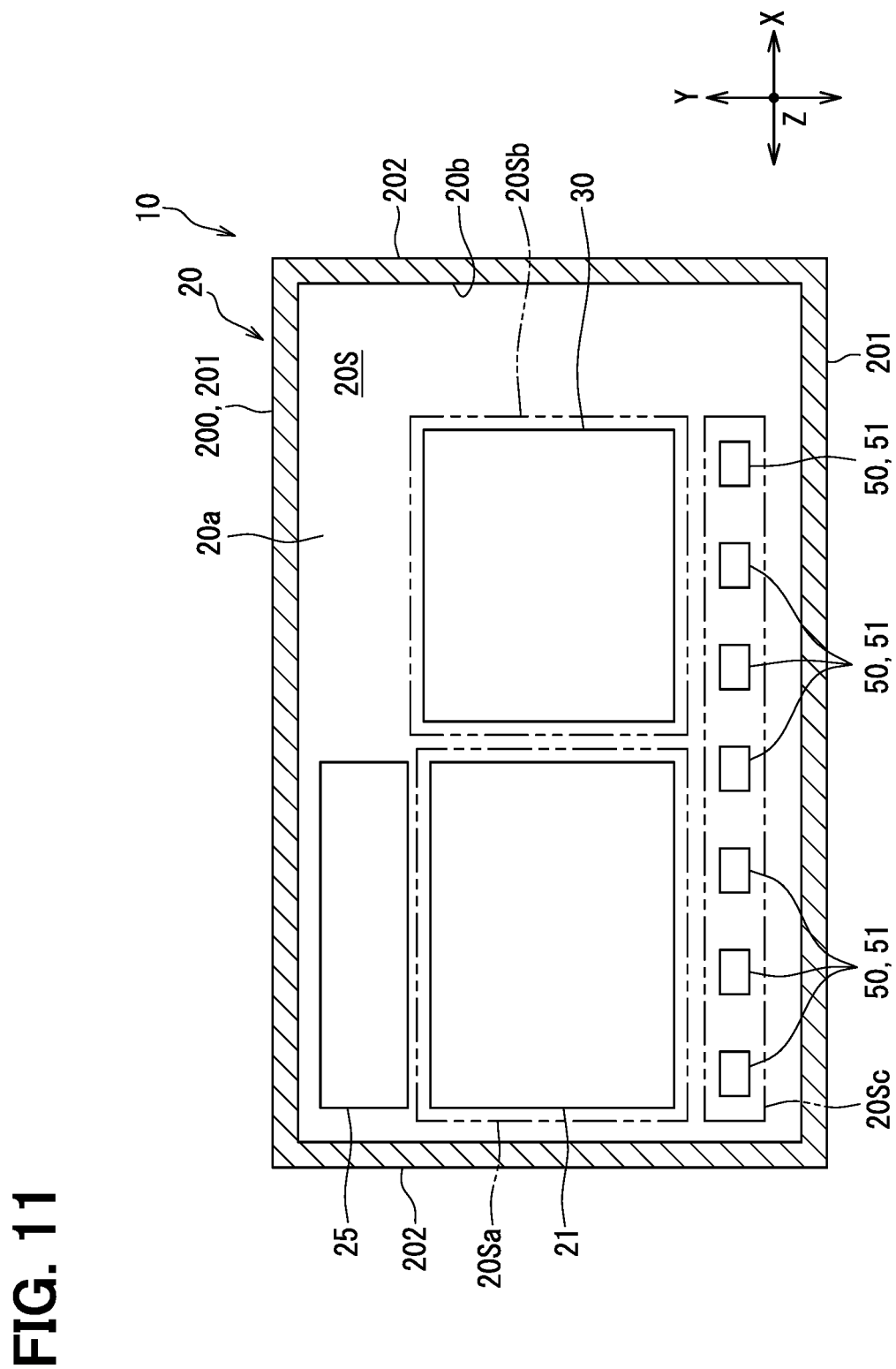
FIG. 11 is a schematic plan view showing the configuration of an electric power converter according to a first modification.

In the first embodiment, the sensor region 20Sc may be provided at a position disposed in the radial direction β with respect to the power region 20Sa and the reactor region 20Sb. For example, in a first modification, as shown in FIG. 11, on a side opposed from the power region 20Sa via the reactor region 20Sb in the X-direction, an end portion of the sensor region 20Sc and an end portion of the reactor region 20Sb overlap each other in the Y-direction. Additionally, on a side opposed from the reactor region 20Sb via the power region 20Sa, an end portion of the sensor region 20Sc and an end portion of the power region 20Sa overlap each other in the Y-direction.

It is noted that the sensor region 20Sc may be in a state of protruding from at least one of the power region 20Sa and the reactor region 20Sb in the X-direction. For example, in the X-direction, on a side opposed from the power region 20Sa via the reactor region 20Sb, the sensor region 20Sc may protrude further than the reactor region 20Sb. Additionally, in the X-direction, on a side opposed from the reactor region 20Sb via the power region 20Sa, the sensor region 20Sc may protrude further than the power region 20Sa.

(Second Modification)

Figure 12:
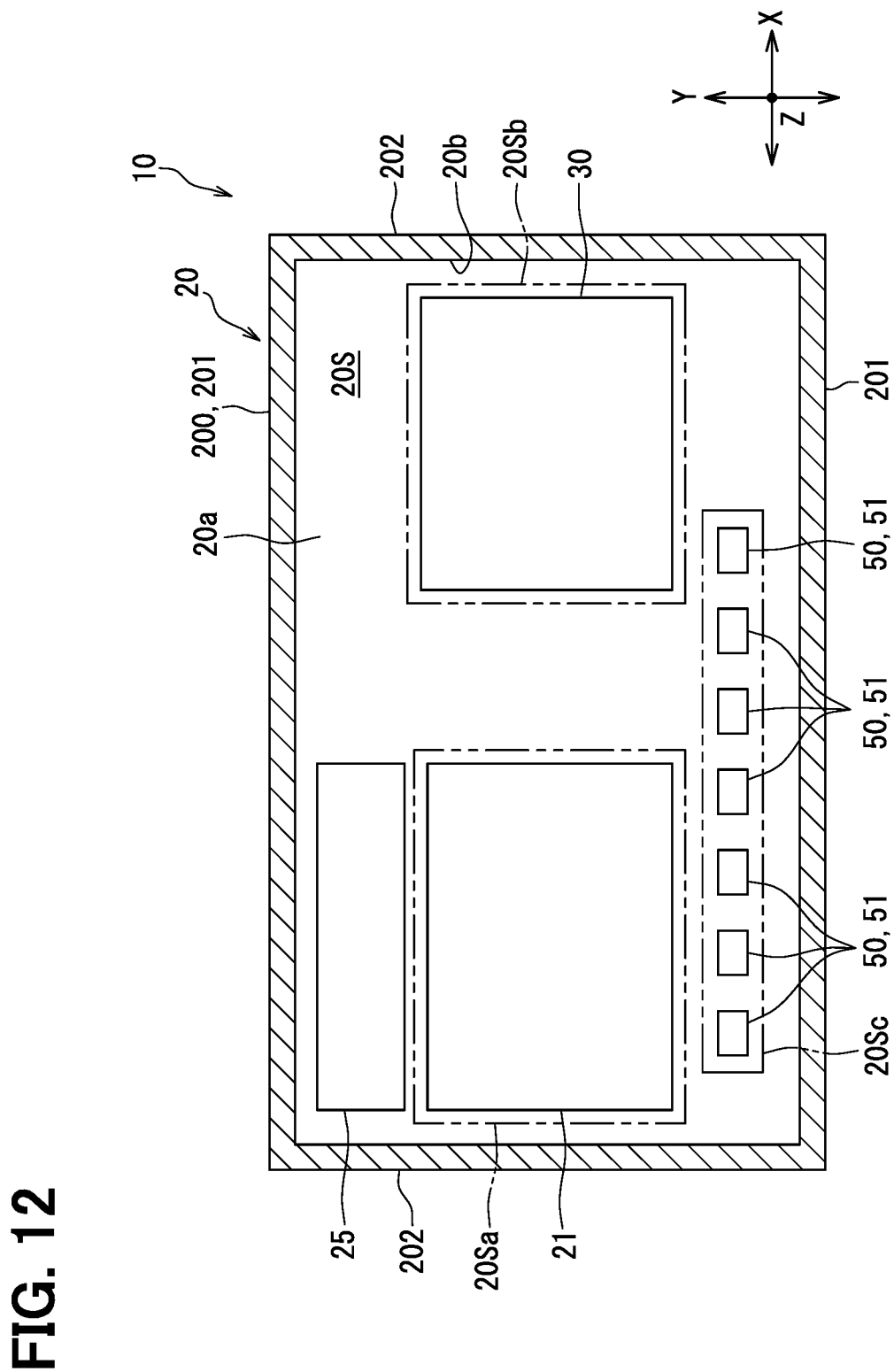
FIG. 12 is a schematic plan view showing the configuration of an electric power converter according to a second modification.

In the first embodiment described above, at least one current sensor 51 may be located at a position overlapping the reactor region 20Sb in the Y-direction. For example, in a second modification, as shown in FIG. 12, only one current sensor 51 is provided at a position overlapping the reactor region 20Sb in the Y-direction. Regarding the busbar 60 and the connecting portion 61 provided with the current sensor 51, the accuracy of current detection can be absolutely enhanced.

(Third Modification)

Figure 13:
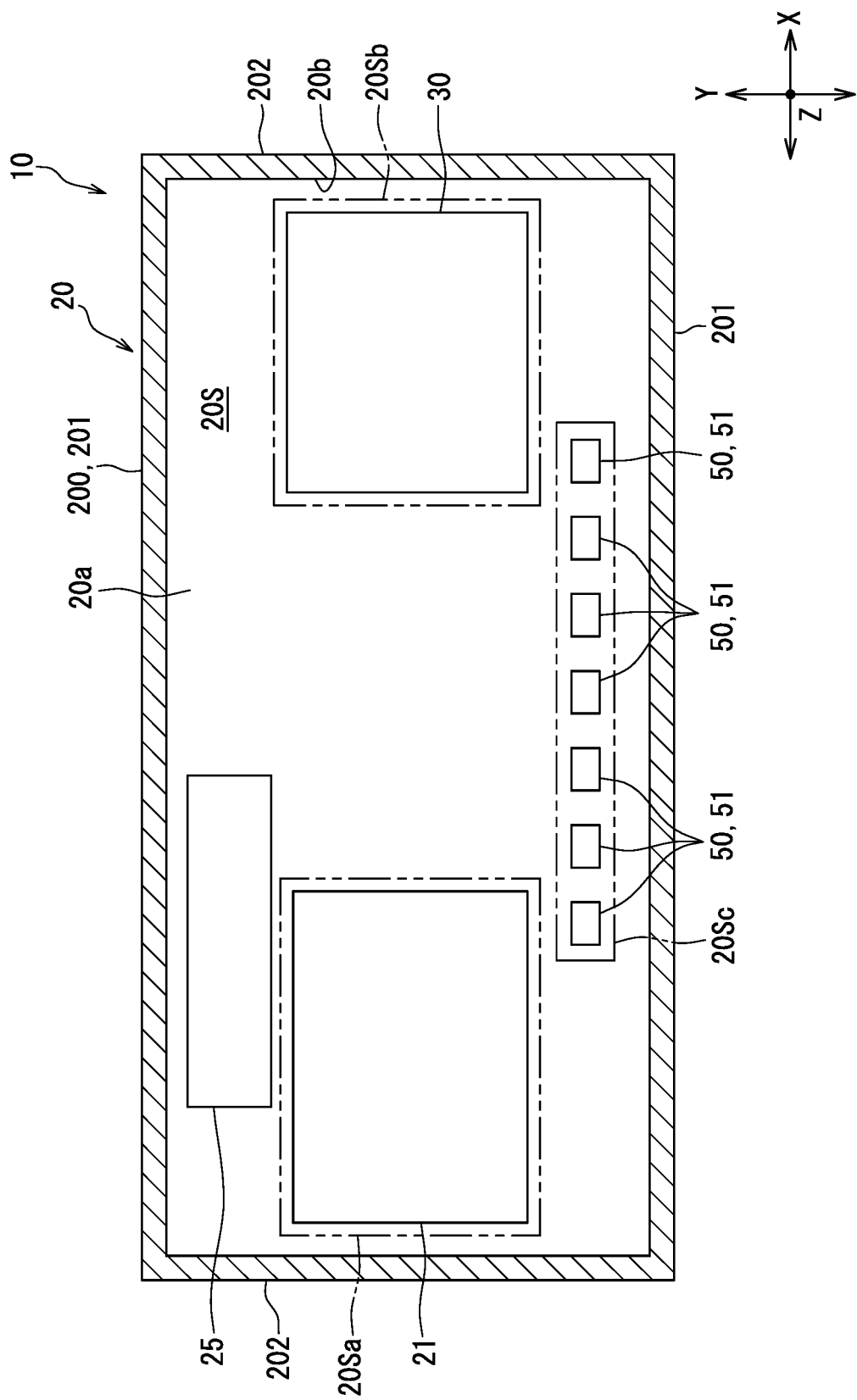
FIG. 13 is a schematic plan view showing the configuration of an electric power converter according to a third modification.

In the first embodiment, at least one current sensor 51 may be located at a position overlapping the power region 20Sa in the Y-direction. For example, in a third modification, as shown in FIG. 13, only one current sensor 51 is provided at a position overlapping the power region 20Sa in the Y-direction. In this way, the relative position of the power region 20Sa with respect to the sensor region 20Sc has a high degree of freedom. In the present modification, the multiple current sensors 51 include one current sensor 51 located at a position overlapping the power region 20Sa in the Y-direction, and one current sensor 51 located at a position overlapping the reactor region 20Sb in the Y-direction. The current sensor 51 may not be required to be provided at a position overlapping the power region 20Sa in the Y-direction. For example, the sensor region 20Sc may be provided at a position spaced apart from the power region 20Sa in the X-direction.

(Fourth Modification)

Figure 14:
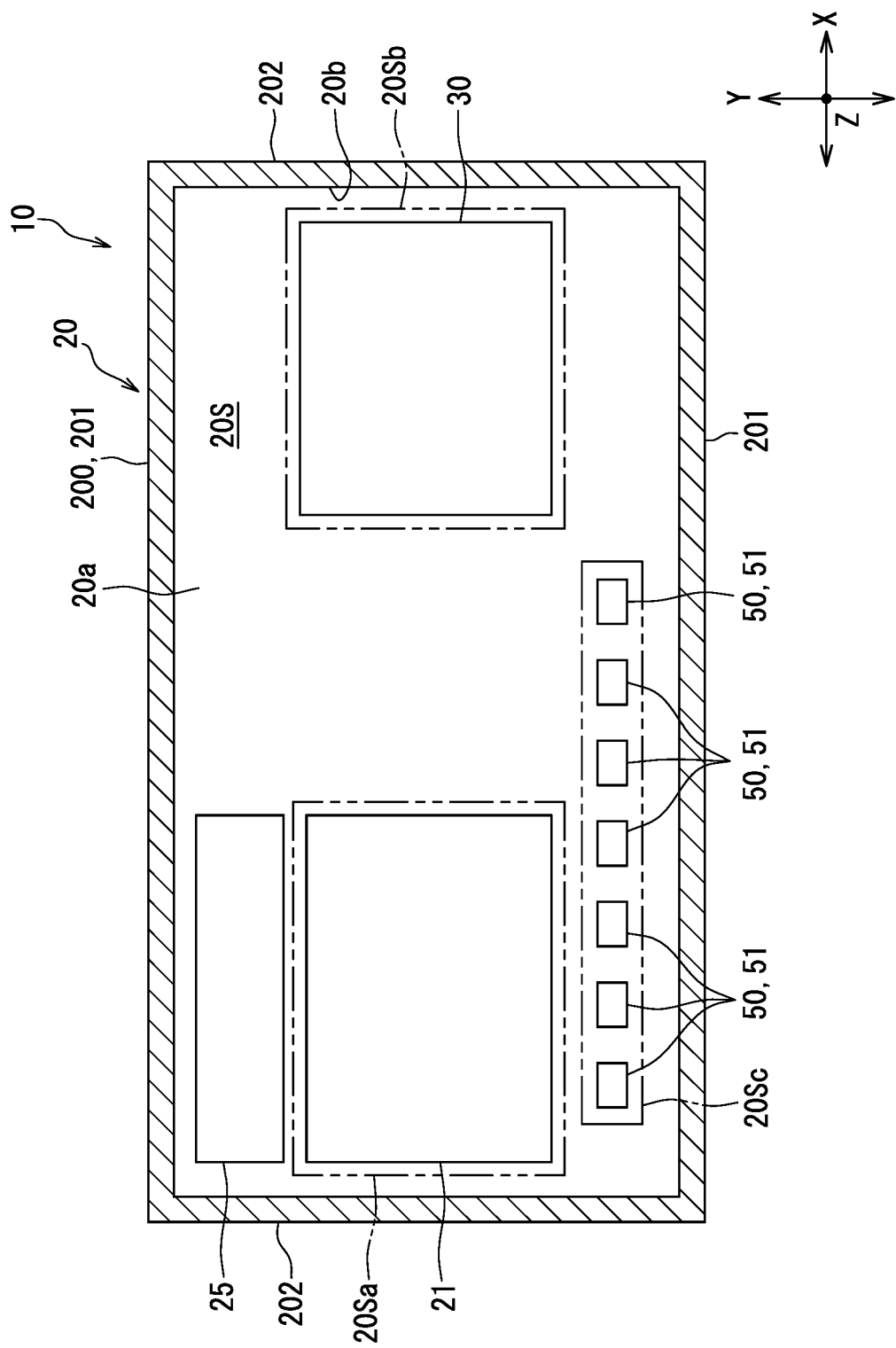
FIG. 14 is a schematic plan view showing the configuration of an electric power converter according to a fourth modification.

In the first embodiment, there may be no any current sensor 51 located at a position overlapping the reactor region 20Sb in the Y-direction. For example, in a fourth modification, as shown in FIG. 14, the sensor region 20Sc is located apart from the reactor region 20Sb in the X-direction. Even in this configuration, for all the current sensors 51 stored at the sensor region 20Sc, the first sensor element 52 and the second sensor element 53 are disposed in the X-direction so that the probability of the sensor elements 52, 53 being disposed along the coil magnetic flux Mc can be decreased.

Second Embodiment

In the first embodiment, the current sensors 51 are all provided at positions spaced apart from the coil 31 in the axial direction α. On the other hand, in a second embodiment, at least one current sensor 51 is provided side by side with the coil 31 in the radial direction β. Configurations, operations, and effects not specifically described in the second embodiment are the same as those in the above-described first embodiment. In the second embodiment, differences from the above-described first embodiment will be mainly described.

Figure 15:
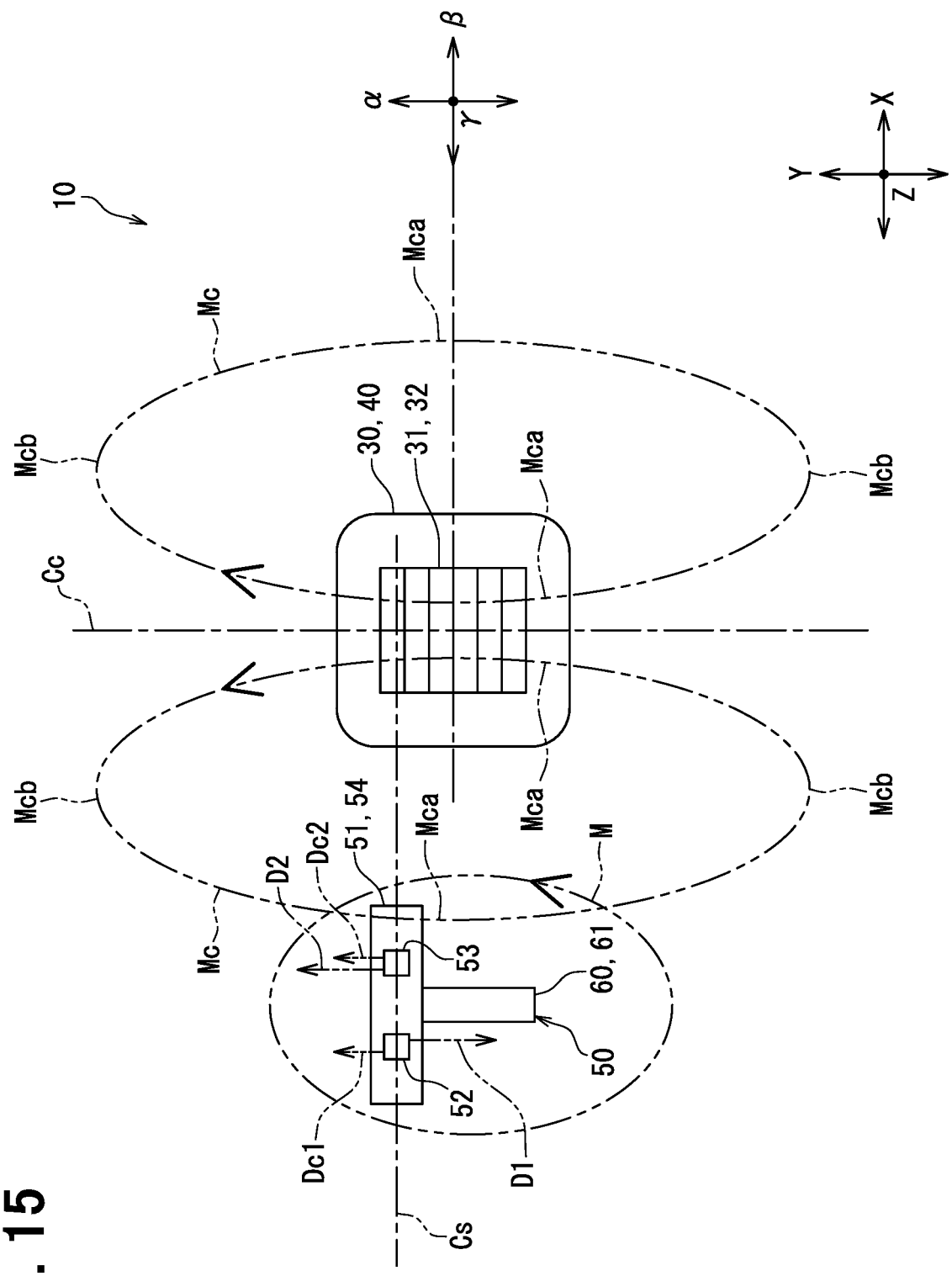
FIG. 15 explains each detection value of a first sensor element and a second sensor element in a second embodiment.

The current sensor 51 shown in FIG. 15 is provided at a position apart from the coil 31 in the radial direction β. The current sensor 51 and the coil 31 are located side-by-side in the radial direction β. In this current sensor 51, the first sensor element 52 and the second sensor element 53 are in a state in which they straddle the long curved portion Mca of the coil magnetic flux Mc in the radial direction β. In other words, the first sensor element 52 and the second sensor element 53 are not disposed along the long curved Mca. In this current sensor 51, both of the first coil value Dc1 and the second coil value Dc2 are one of positive values and negative values, as similar to the first embodiment in which the current sensor 51 and the coil 31 are located side by side in the axial direction α. Therefore, as similar to the first embodiment, it is possible to inhibit a situation in which the coil magnetic flux Mc is included as noise in the detection values detected by the sensor elements 52, 53.

Third Embodiment

In the first embodiment, the crush ribs 76, 77 are provided at positions that do not overlap the snap fits 801, 802 in the radial direction β. In contrast, in a third embodiment, the crush ribs 76 and 77 are provided at positions overlapping the snap fits 801 and 802 in the radial direction β. Configurations, operations, and effects not specifically described in the third embodiment are the same as those in the above-described first embodiment. In the third embodiment, differences from the above-described first embodiment will be mainly described.

Figure 16:
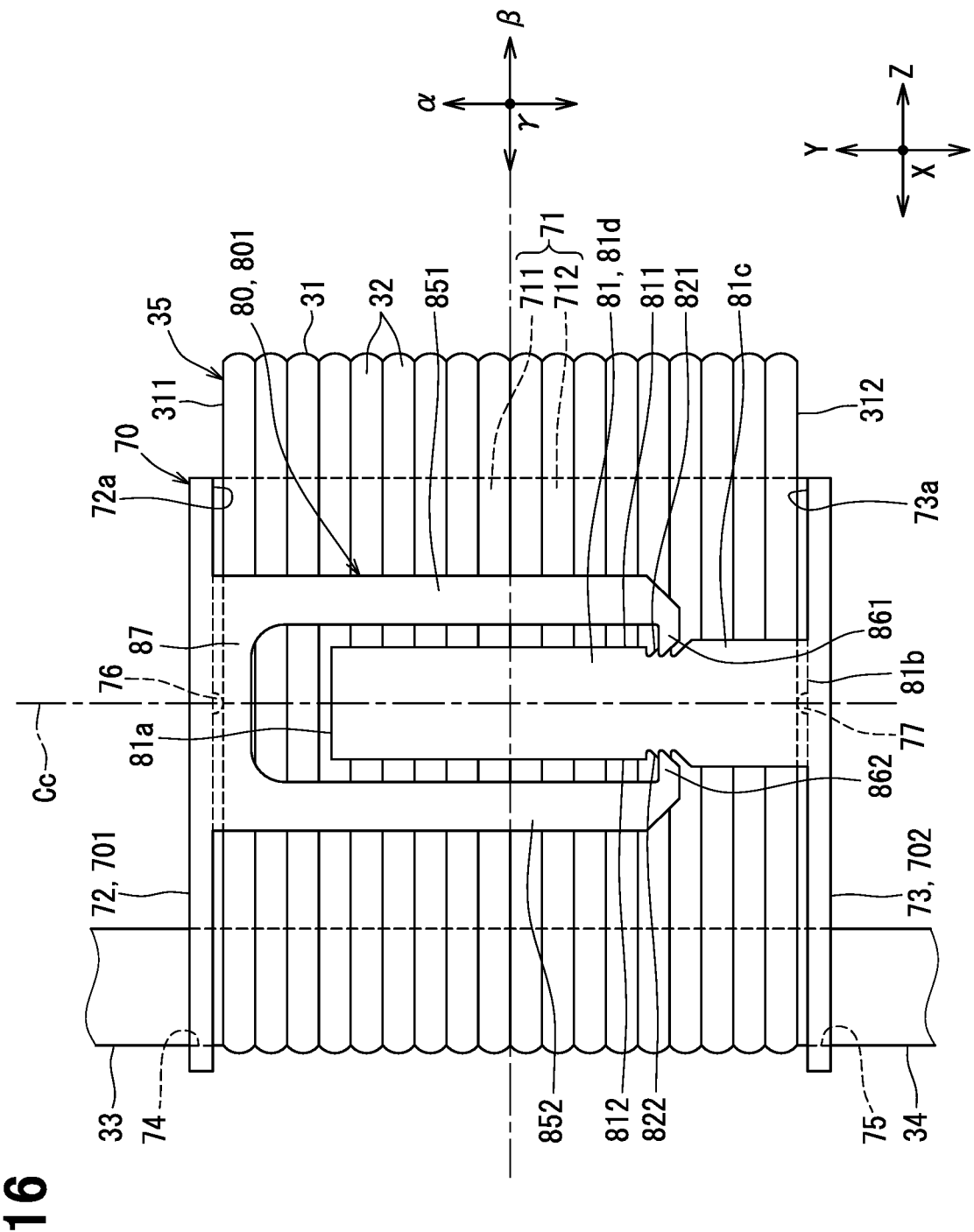
FIG. 16 illustrates a view of a bobbin and a coil body from a first snap-fit side in a third embodiment.

As shown in FIG. 16, the crush ribs 76, 77 are provided at positions lined up with the snap fits 801, 802 in the radial direction β. For example, with regard to the first snap fit 801, the first crush rib 76 is provided between the first arm portion 851 and the second arm portion 852. This first crush rib 76 is located at a position spaced apart from both the first arm portion 851 and the second arm portion 852 in the circumferential direction γ. This first crush rib 76 is located, for example, at a substantially central position between the first arm portion 851 and the second arm portion 852.

Regarding the first snap fit 801, the second crush rib 77 is provided between the first receiving surface 821*a* and the second receiving surface 822*a*. The second crush rib 77 is located at a position spaced apart from both the first receiving surface 821*a* and the second receiving surface 822*a* in the circumferential direction γ. The second crush rib 77 is located, for example, at a substantially central position between the first receiving surface 821*a* and the second receiving surface 822*a*.

Regarding the second snap fit 802, the first crush rib 76 is provided between the first receiving surface 821*a* and the second receiving surface 822*a*. The first crush rib 76 is located at a position spaced apart from both the first receiving surface 821*a* and the second receiving surface 822*a* in the circumferential direction γ. The first crush rib 76 is located, for example, at a substantially central position between the first receiving surface 821*a* and the second receiving surface 822*a*.

Regarding the second snap fit 802, the second crush rib 77 is provided between the first arm portion 851 and the second arm portion 852. The second crush rib 77 is located at a position spaced apart from both the first arm portion 851 and the second arm portion 852 in the circumferential direction γ. The second crush rib 77 is located, for example, at a substantially central position between the first arm portion 851 and the second arm portion 852.

According to the present embodiment, the crush ribs 76,77 are provided between the first receiving surface 821*a* and the second receiving surface 822*a* in the circumferential direction γ. In the manufacturing process of the reactor unit 30, the operator brings the first flange portion 72 and the second flange portion 73 closer together in order to engage the receiving surfaces 821*a*, 822*a* and the engaging surfaces 861*a*, 862*a*. When the operator presses the respective portions of the flange portions 72, 73 that overlap the snap fits 801, 802, the respective portions of the flange portions 72, 73 that overlap the crush ribs 76, 77 will be pressed. In this case, the operation of engaging the receiving surfaces 821*a*, 822*a* with the engaging surfaces 861*a*, 862*a*, and the operation of deforming the crush ribs 76, 77 to crush the crush ribs 76, 77 are performed concurrently. Therefore, it is easier to assemble the first bobbin portion 701 and the second bobbin portion 702. Further, with this configuration, the coil 31 can be reliably held by the crush ribs 76, 77 at positions overlapping the snap fits 801, 802 in the circumferential direction γ.

Other Embodiments

The disclosure in the present specification is not limited to the illustrated embodiments. The disclosure encompasses the illustrated embodiments and variations thereof by those skilled in the art. For example, the disclosure is not limited to the combinations of components and elements shown in the embodiments, and various modifications and implementations can be performed. The disclosure may be implemented in various combinations. The disclosure may have additional portions that may be added to the embodiments. The disclosure encompasses those in which components and elements of the embodiments are omitted. The disclosure encompasses replacement or combination of the parts and elements between one embodiment and another. The disclosed technical scope is not limited to the description of the embodiments. It should be understood that some disclosed technical ranges are indicated by description of claims, and includes every modification within the equivalent meaning and the scope of description of claims.

(Configuration Group A)

In each of the above embodiments, the multiple current sensors 51 may be disposed in the axial direction α. Moreover, the multiple current sensors 51 may not be disposed in a single row. For example, the multiple current sensors 51 may be disposed in multiple rows. As long as at least one of the multiple current sensors 51 in which the sensor elements 52, 53 are disposed in the radial direction β is included, the current sensor 51 in which the sensor elements 52, 53 are disposed in the axial direction α may be included. Only one current sensor 51 may be included in the electric power converter 10.

In each of the embodiments described above, the first sensor element 52 and the second sensor element 53 in the current sensor 51 may be disposed in the Z-direction instead of the X-direction as long as they are disposed in the radial direction R. Additionally, the first sensor element 52 and the second sensor element 53 may be disposed in a direction tilted to the element center line Cs. Furthermore, in the sensor elements 52 and 53, the element center line Cs may not be orthogonal to the coil center line Cc.

In each of the embodiments described above, if the sensor elements 52 and 53 can detect the connection magnetic flux M by the connecting portion 61, the direction in which the sensor elements 52 and 53 are lined up is not orthogonal to the direction of the current flowing through the connecting portion 61. For example, the connecting portion 61 may be curved so as to bulge or recess in the Z-direction in the busbar 60, or the plate surface of the connecting portion 61 may be provided in an orientation extending in the Z-direction. Moreover, the detection target for which current sensor 51 detects a current may not be the connecting portion 61 of the busbar 60 and may not be the busbar 60, as long as the detection target is an electrically conductive portion through which the current flows. For example, the detected magnetic flux for the sensor elements 52 and 53 may be a magnetic flux generated by a current flowing through a portion of the busbar 60 that is different from the connecting portion 61, or a magnetic flux generated by a current flowing through an electrically conductive portion different from the busbar 60 in the electric power converter 10.

In each of the embodiments described above, the sensor elements 52 and 53 may be located at any position relative to the connecting portion 61 as long as the connection magnetic flux caused by the connecting portion 61 can be detected. For example, the sensor elements 52 and 53 may be provided on a side opposed from the coil 31 with the connecting portion 61 interposed therebetween.

In each of the above embodiments, the current sensor 51 may not be a differential type current sensor as long as the current is calculated using the detection value of the first sensor element 52 and the detection value of the second sensor element 53. For example, the current sensor 51 may calculate the sum of the detection value of the first sensor element 52 and the detection value of the second sensor element 53, and adopt the calculated result to calculate the current.

In each of the above embodiments, one current sensor 51 may include three or more sensor elements that detect magnetic flux. For example, the current sensor 51 may include a third sensor element in addition to the first sensor element 52 and the second sensor element 53. In this way, in the configuration in which the current sensor 51 has three sensor elements, the current is calculated in the current sensor 51 using the detection values of each of the three sensor elements.

(Configuration Group B)

In each of the embodiments described above, in the snap fits 801 and 802, at least one part of the receiving surfaces 821a, 822a and the engaging surfaces 861a, 862a may have a reversed configuration. For example, the connecting base portion 81 may be provided with the engaging surfaces 861a, 862a instead of the receiving surfaces 821a, 822a, and the arm portions 851, 852 may be provided with receiving surfaces 821a, 822a instead of the engaging surfaces 861a, 862a. Further, the multiple engaging surfaces 861a, 862a may be disposed in the radial direction β. That is, at least one of the multiple receiving surfaces 821a, 822a and the multiple engaging surfaces 861a, 862a may be disposed in the axial direction α. Furthermore, when the receiving surfaces 821a, 822a and the engaging surfaces 861a, 862a engage, the connecting base portion 81 may be elastically deformed.

In each of the above embodiments, the first receiving surface 821a and the second receiving surface 822a may be provided at positions being apart in the axial direction α. Additionally, the first receiving distance L1 and the second receiving distance L2 may be different. Furthermore, the receiving distances L1, L2 may be different for the multiple receiving surfaces 821a, 822a disposed in the axial direction α.

In each of the above embodiments, the snap fits 801, 802 may not be disposed in the radial direction β as long as they are disposed in the circumferential direction γ. The first bobbin portion 701 may have at least one of the connecting base portion 81 and the arm portions 851, 852 provided in plural. Similarly, the second bobbin portion 702 may have at least one of the connecting base portion 81 and the arm portions 851, 852 provided in plural. The bobbin 70 may have only one snap fit such as the snap fits 801 and 802, or may have three or more snap fits.

In each of the above embodiments, the rib heights H1, H2 may not be smaller than the receiving distances L1, L2. Additionally, in a configuration where the rib heights H1, H2 are smaller than the receiving distances L1, L2, the sum of the rib heights H1, H2 may be smaller than the receiving distances L1, L2. Furthermore, the first rib height H1 and the second rib height H2 may be different.

In each of the embodiments described above, the crush ribs 76, 77 may be provided at the inner or outer peripheral ends of the flange surfaces 72a, 73a in the radial direction β. The multiple crush ribs 76, 77 may include the crush ribs that overlap the snap fits 801, 802 in the circumferential direction γ, and the crush ribs that are spaced apart from the snap fits 801, 802 in the circumferential direction γ. In each of the above embodiments, the bobbin 70 may have only one of the first crush rib 76 and the second crush rib 77. That is, the bobbin 70 may have at least one of the first crush rib 76 and the second crush rib 77.

(Configuration Group C)

In each of the embodiments described above, in the plate spring 110, the first spring portion 111 may not be folded back toward the connecting support portion 113c with respect to the first support portion 113a. Similarly, the second spring portion 112 may not be folded back toward the connecting support portion 113c with respect to the second support portion 113b.

In each of the above embodiments, as long as the relative displacement of the core 40 with respect to the reactor case 90 is regulated by the plate spring 110, an arbitrary portion of the plate spring 110 may be fixed to the reactor case 90. For example, as long as the support spring portion 113 is fixed to the case extending surface 93, the first spring portion 111 may be at a position apart from the first case surface 91, and the second spring portion 112 may be at a position apart from the second case surface 92.

(Common)

In each of the above embodiments, the vehicle equipped with the electric power converter 10 may be, for example, a passenger car, a bus, a construction vehicle or an agricultural machinery vehicle. The vehicle is one of the movable bodies. The movable body equipped with the electric power converter 10 may be, for example, a train, an airplane or a ship. The electric power converter 10 may be, for example, an inverter device or a converter device. The converter device may be, for example, a power supply device for AC input and DC output, a power supply device for DC input and DC output, and a power supply device for AC input and AC output.

What is claimed is:

1. An electric power converter configured to convert electric power supplied from a power supply to an electrical load, the electric power converter comprising:
   a coil extending in an axial direction of the coil, the coil configured to allow a current to flow through the coil;
   an electrically conductive portion located at a position apart from the coil, the electrically conductive portion configured to allow the current to flow through the electrically conductive portion; and
   a current sensor configured to detect the current flowing through the electrically conductive portion, wherein:
   the current sensor includes a first sensor element and a second sensor element, each of which is configured to detect a magnetic flux being a detected magnetic flux generated by the current flowing through the electrically conductive portion; and
   the first sensor element and the second sensor element are disposed in a radial direction of the coil.

2. The electric power converter according to claim 1, wherein the first sensor element and the second sensor element are located at respective positions apart from the coil in the axial direction.

3. The electric power converter according to claim 1,
wherein the first sensor element and the second sensor element are located between the coil and the electrically conductive portion in the axial direction.

4. The electric power converter according to claim 1, wherein:
- a virtual element center line extends in the radial direction and passes through a center of the first sensor element and a center of the second sensor element;
- a virtual coil center line extends in the axial direction and passes through a center of the coil; and
- the virtual element center line is orthogonal to the virtual coil center line.

5. The electric power converter according to claim 1, further comprising:
- a device case extending in a direction as a lengthwise direction of the device case, the lengthwise direction being identical to the radial direction of the coil, the device case configured to store the current sensor and the coil, the current sensor having a plurality of current sensors,
wherein the plurality of current sensors are disposed in the radial direction at respective positions apart from the coil in the axial direction.

6. The electric power converter according to claim 5,
wherein the device case includes:
- a coil region configured to store the coil; and
- a sensor region configured to store the plurality of current sensors, the sensor region extending in the radial direction, the sensor region and the coil region being disposed in the axial direction.

7. The electric power converter according to claim 6,
wherein the sensor region is located at a position not overlapping the coil region in the axial direction.

8. The electric power converter according to claim 6, wherein:
- the electrically conductive portion includes a plurality of electrically conductive portions being respectively in a plurality of phases of the electric power converter;
- the plurality of current sensors are respectively provided for the plurality of electrically conductive portions and are stored in the sensor region; and
- at least one of the plurality of current sensors is located at a position overlapping the coil region in the axial direction.

9. The electric power converter according to claim 6, wherein:
- the device case further includes a power region configured to store a power module having a power element configured to convert the electric power; and
- the power region the coil region are disposed in the radial direction, and the power region and the sensor region are disposed in in the axial direction.

10. The electric power converter according to claim 9,
wherein the sensor region is located at a position overlapping both of at least a portion of the coil region and at least a portion of the power region in the axial direction.

* * * * *